United States Patent [19]
Morita et al.

[11] Patent Number: 5,793,717
[45] Date of Patent: Aug. 11, 1998

[54] INFORMATION RECORDING AND REPRODUCING APPARATUS AND METHOD OF LOADING/UNLOADING DISCS

[75] Inventors: Yuji Morita; Hiroyuki Sato; Toshiaki Yoshino; Makoto Nakagawa; Keitaro Kaburagi, all of Saitama-ken, Japan

[73] Assignee: Pioneer Electronic Corporation, Tokyo, Japan

[21] Appl. No.: 590,421

[22] Filed: Jan. 24, 1996

[30] Foreign Application Priority Data

Jan. 25, 1995 [JP] Japan .................... 7-100048

[51] Int. Cl.$^6$ ............................................. G11B 20/00
[52] U.S. Cl. ................................................. 369/34
[58] Field of Search ........................ 369/34, 36, 191, 369/77.2, 75.2

[56] References Cited

U.S. PATENT DOCUMENTS 5,034,935  7/1991  Ishibashi et al. .................. 369/34
5,099,466  3/1992  Kimura et al. .................... 369/34

FOREIGN PATENT DOCUMENTS 63-204548  8/1988  Japan ...................... 360/191
1154359    6/1989  Japan ...................... 369/191

*Primary Examiner*—Stuart S. Levy
*Assistant Examiner*—David D. Davis
*Attorney, Agent, or Firm*—Nikaido, Marmelstein, Murray & Oram LLP

[57] ABSTRACT

A plurality of disc players are arranged in a vertical direction, a plurality of frames each holding a tray are mounted in a magazine pack. A magazine pack loading means is provided for moving the magazine pack taken into an apparatus body, and a frame separation and holding means is provided for separating the frames one at a time and positions them at predetermined locations corresponding to the disc players when moving the magazine pack by the magazine pack loading means. A tray transfer means is provided for transferring the trays between the predetermined locations and the disc players.

5 Claims, 38 Drawing Sheets

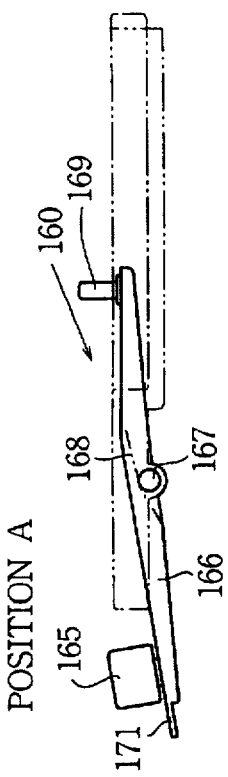
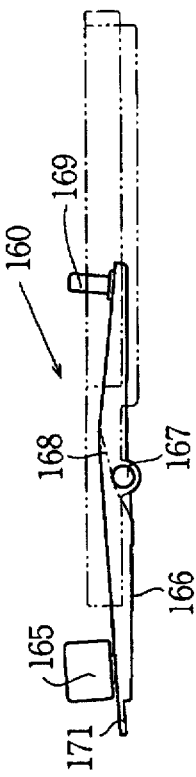
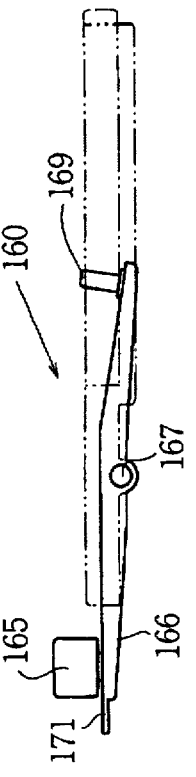
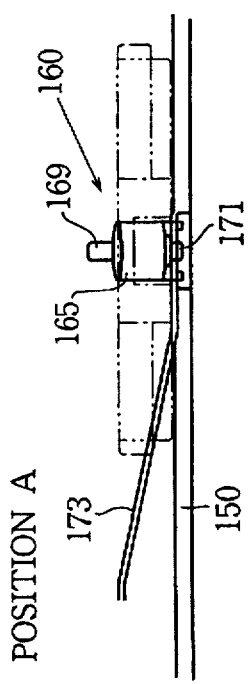
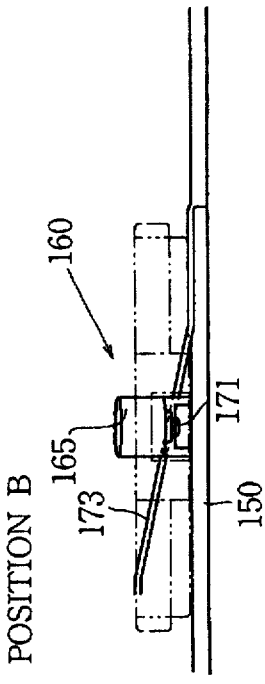
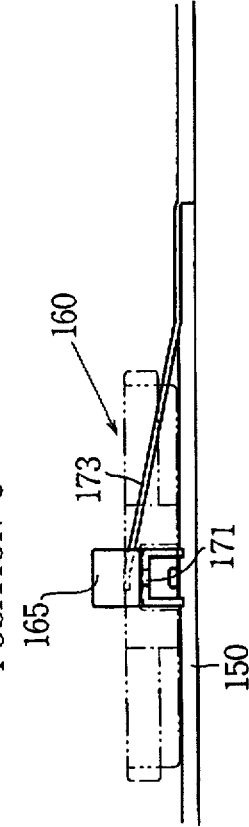

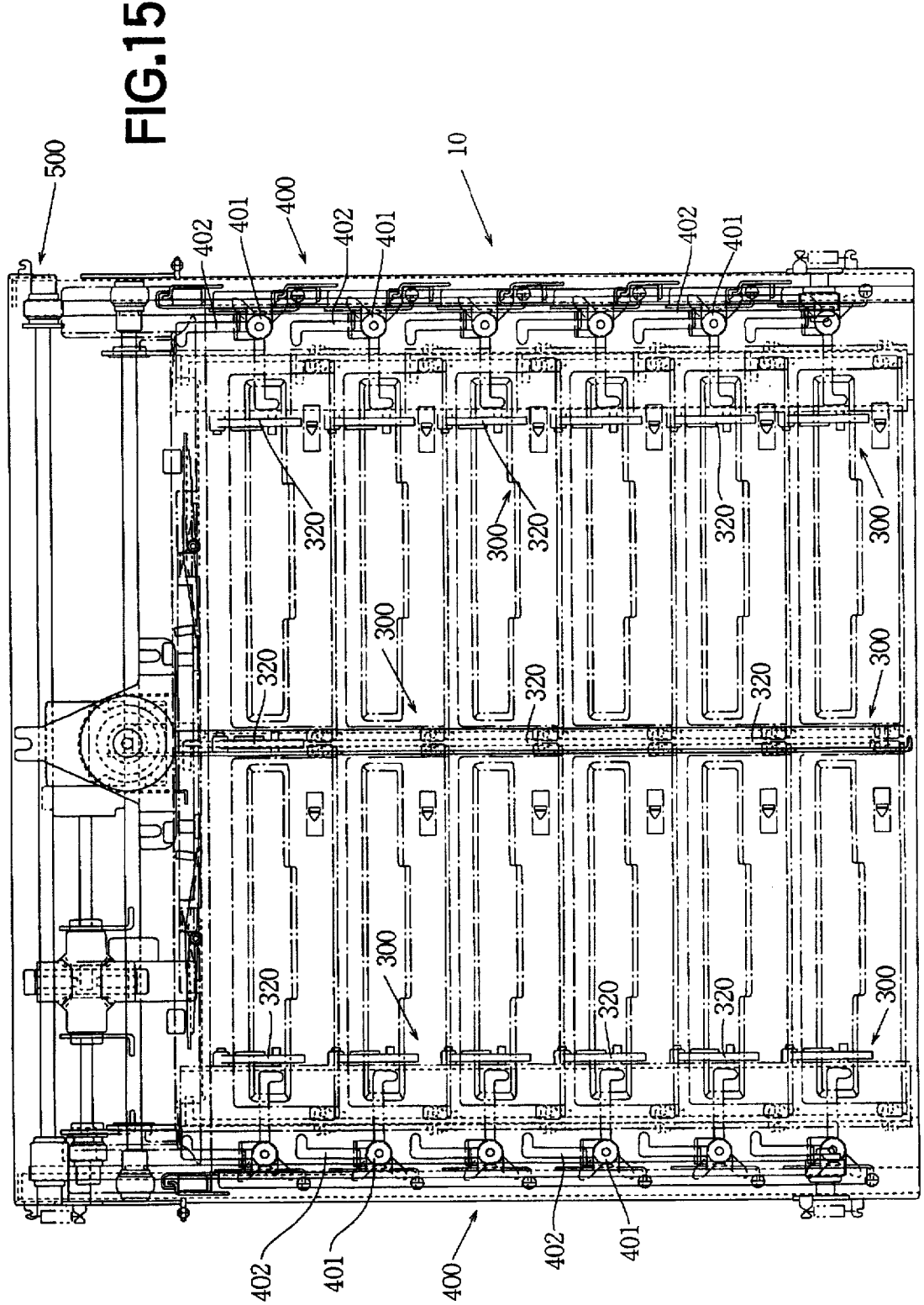

INFORMATION RECORDING AND REPRODUCING APPARATUS AND METHOD OF LOADING/UNLOADING DISCS

BACKGROUND OF THE INVENTION

The present invention relates to an information recording and reproducing apparatus, which performs reproducing and/or recording operations on a plurality of discs simultaneously by a plurality of disc drive units, and a method of moving discs.

An information recording and reproducing apparatus has been developed in recent years, which is constructed to automatically load and unload a plurality of discs contained in a cartridge to and from a plurality of disc drive units for simultaneous reproducing an/or recording of these discs by the disc drive units.

One such information recording and reproducing apparatus is disclosed in Japanese Patent Application Laid-Open 1-227260 that describes a disc apparatus as shown in FIGS. 43 and 44.

In the process of loading, as shown in FIG. 43, a cartridge 1 accommodating a plurality of discs 2 and moved by a carriage is stopped temporarily by the side of each disc drive unit, starting with an uppermost disc drive unit 3A and ending with a lowermost disc drive unit 3F, and at each step position the discs 2 contained in the cartridge 1 are drawn into the respective disc drive units 3A–3F.

During the unloading process, as shown in FIG. 44, the discs 2 are returned into the cartridge 1 in a sequence reverse to the loading operation.

With such a configuration, a plurality of discs 2 can be managed by a single cartridge 1 and handled easily.

In the disc loading operation of the conventional disc apparatus mentioned above, however, because the carriage, when moving vertically, is halted at the stop positions in front of the disc drive units 3A–3F arranged along the direction of carriage travel and during each stop the discs 2 are drawn into the disc drive units 3A–3F, the carriage cannot move to the next drive unit until the loading of the current disc 2 is completed, prolonging the overall disc loading time.

SUMMARY OF THE INVENTION

The object of the present invention is to provide an information recording and reproducing apparatus which may remove the above-mentioned disadvantages and may reduce the disc loading/unloading time, simplify the mechanism and optimize the disc loading/unloading operations.

According to claim 1, there is provided an information recording and reproducing apparatus comprising, a plurality of disc players arranged in a predetermined direction inside an apparatus body, a magazine pack containing a plurality of frames, each holding a tray holding a disc and separable from each others, a magazine pack loading means for moving the magazine pack taken into the apparatus body in the predetermined direction of disc player attachment. A frame separation and holding means is provided for separating the frames one at a time and positions them at predetermined locations corresponding to the disc players, when moving the magazine pack by the magazine pack loading means, and a tray transfer means is provided for transferring the trays between the predetermined locations and the disc players.

The other objects and features of this invention will become understood from the following description with reference to the accompanying drawings.

BRIEF DESCRIPTION OF DRAWINGS

FIGS. 14a through 14f are schematic diagrams showing the operation of the magazine loading mechanism of FIG. 12;

FIG. 15 is a front view showing the internal structure of the information recording and reproducing apparatus of FIG. 1;

DETAILED DESCRIPTION OF THE PREFERRED EMBODIMENTS

Figure 1:
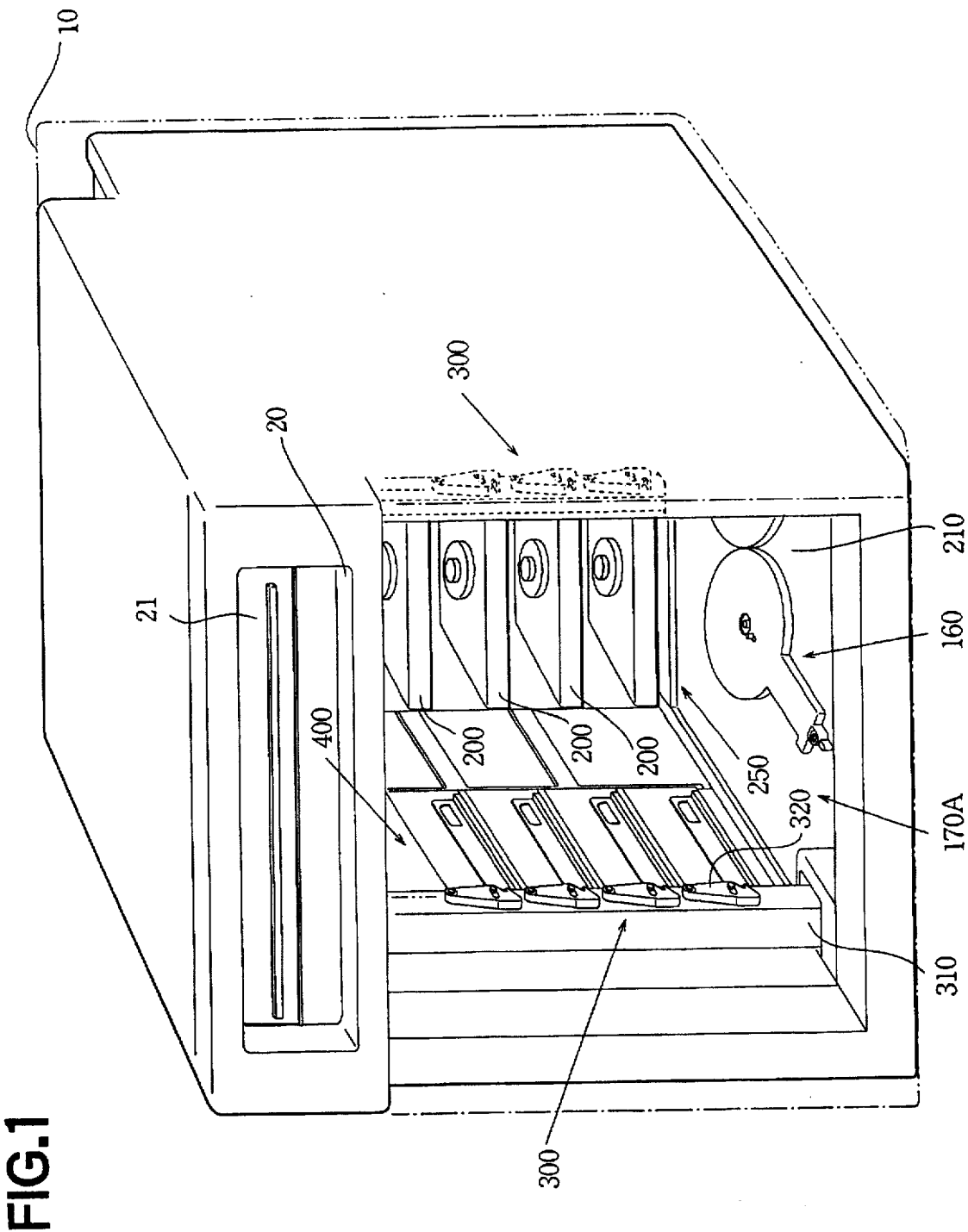
FIG. 1 is a perspective view showing an information recording and reproducing apparatus as an embodiment of this invention.

FIG. 1 shows an information recording and reproducing apparatus as one embodiment of this invention.

As shown in the figure, the apparatus body 10 is provided with a magazine pack insertion opening 20 at a front top, into which a magazine pack 100 described later is loaded. The magazine pack insertion opening 20 is closed by a cover 21, which can be freely opened and closed in order to prevent ingress of dust into the interior of the apparatus body 10.

Figure 35:
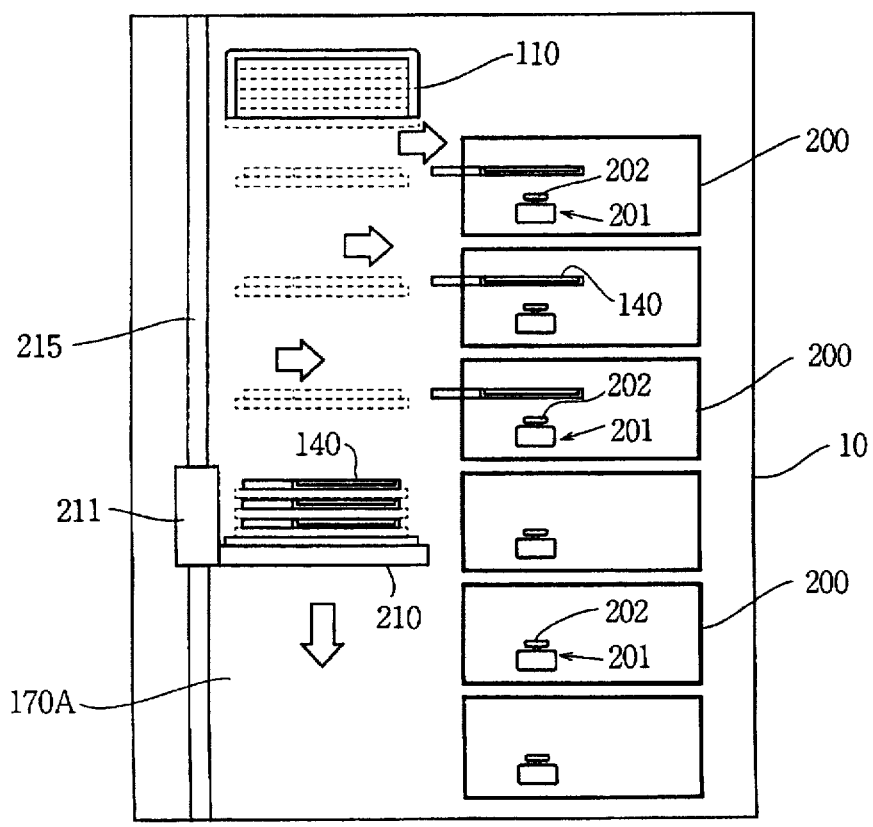
FIG. 35 is a schematic diagram showing the loading process of FIG. 33.
Figure 36:
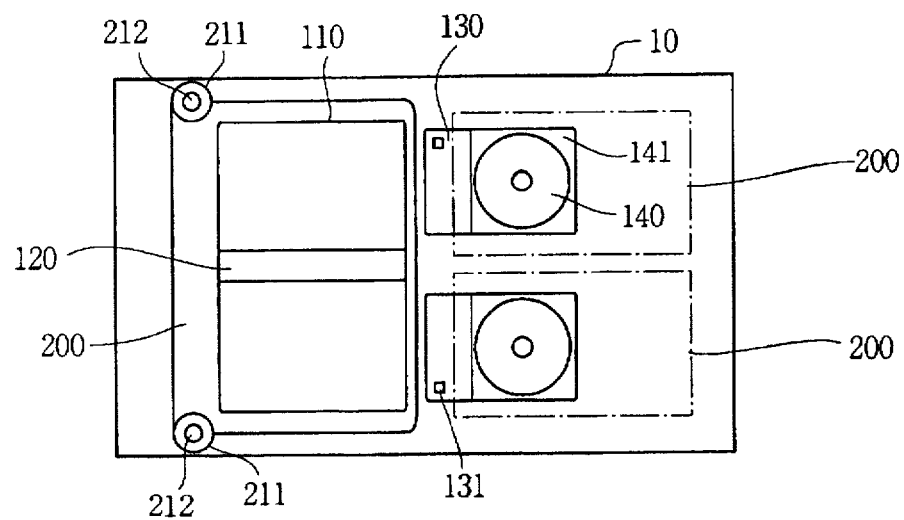
FIG. 36 is a schematic diagram showing the loading process of FIG. 33.
Figure 37:
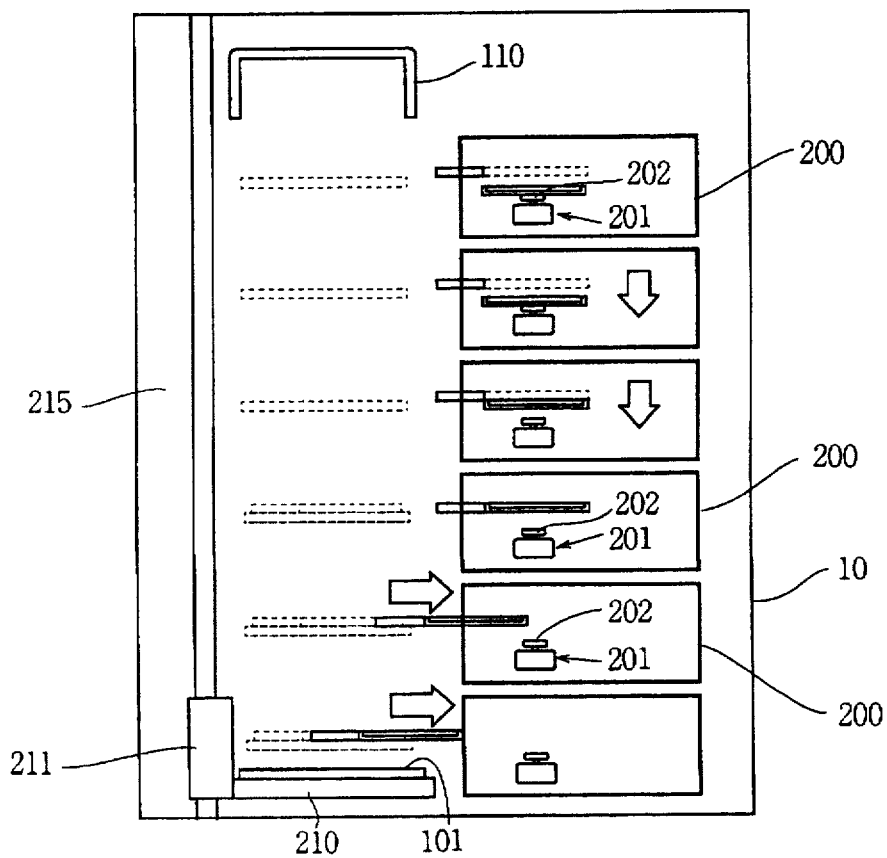
FIG. 37 is a schematic diagram showing the loading process of FIG. 33.

In a front portion of the apparatus body 10, there is a space 170A for vertically moving a carriage base 210 along a guide shaft 215 shown in FIG. 35. In a rear portion of the apparatus body 10, there is a space 250 for a plurality of disc drive units 200 arranged in shelves. Here, a total of 12 disc drive units 200 are installed in a 6 (vertical)×2 (horizontal) arrangement. The magazine pack 100 can accommodate up to 12 discs 140 (FIG. 2) according to the number of the disc drive units 200 installed.

Further, on the carriage base 210 is arranged a magazine loading mechanism 160 (FIG. 12) which introduces the magazine pack 100 inserted from the magazine pack insertion opening 20 onto the carriage base 210.

Figure 2:
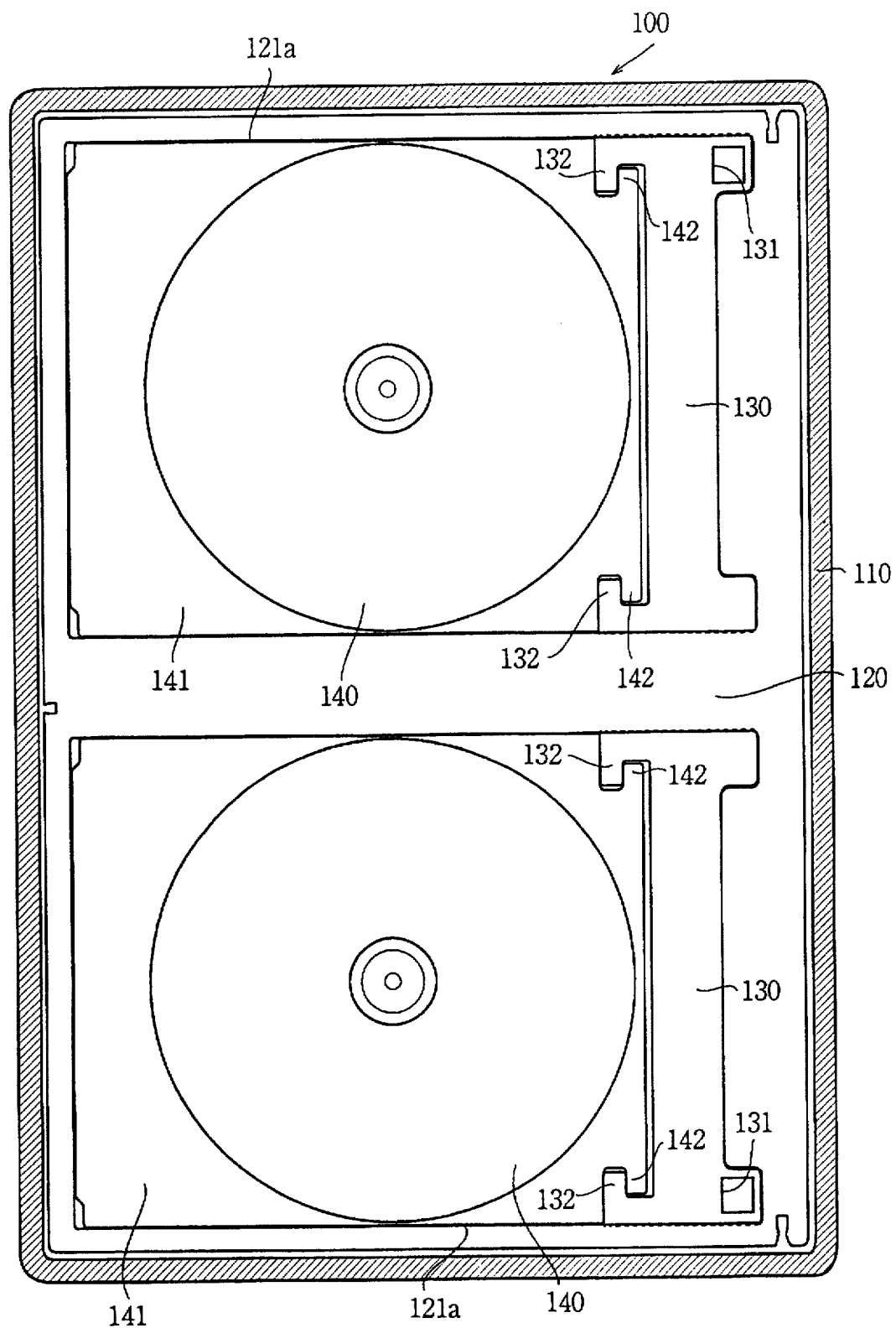
FIG. 2 is a cross section showing the details of the magazine pack to be loaded into the information recording and reproducing apparatus of FIG. 1.
Figure 3:
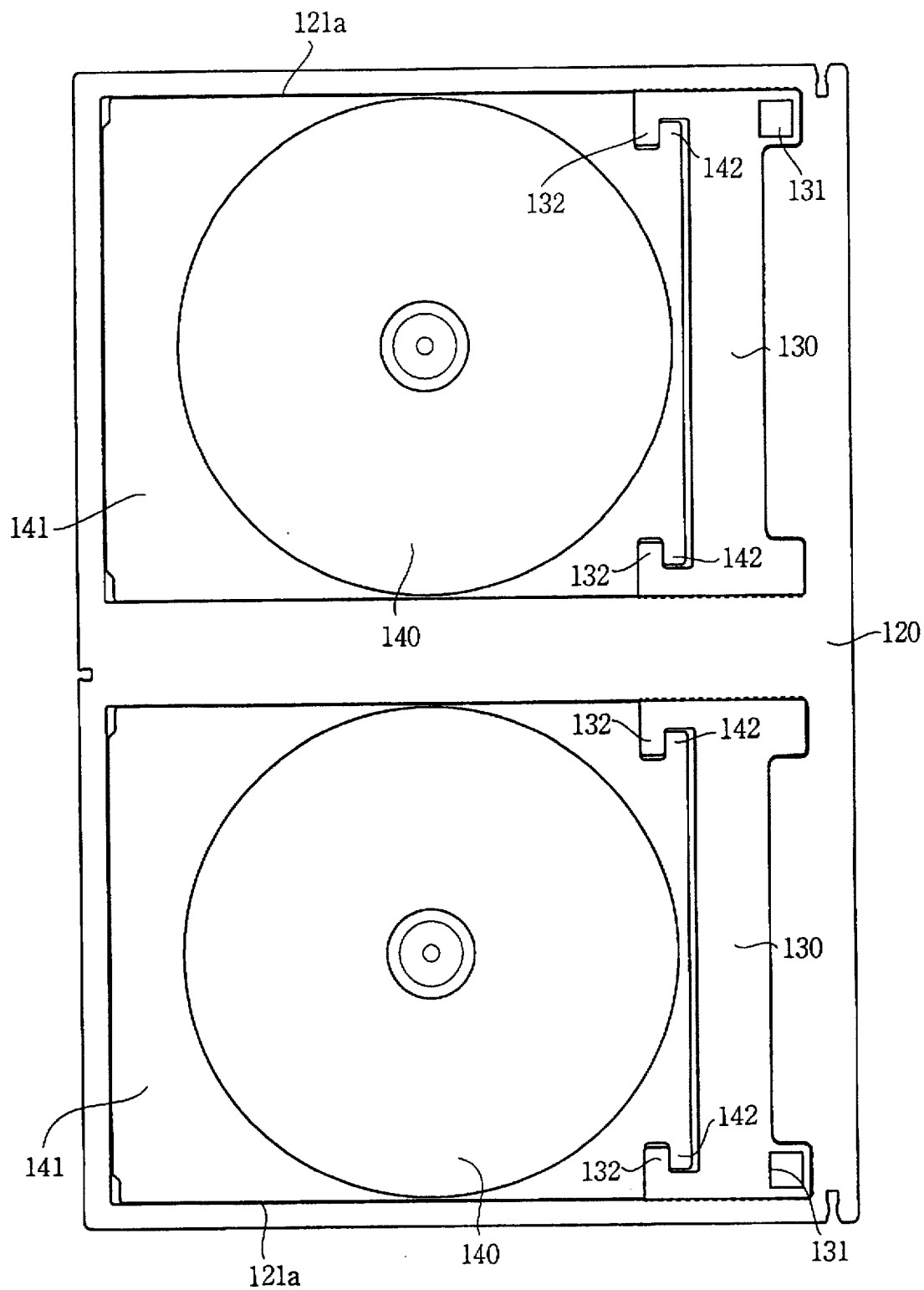
FIG. 3 is a plan view showing the tray and disc accommodated in the frame contained in the magazine pack of FIG. 2.

Installed inside the apparatus body 10 is two sets of hook mechanisms 300 on opposite sides of the space 170A, each hook mechanism has hook members 320 corresponding to the disc drive units 200. Each hook member 320 is rotatably mounted on a hook support member 310 and provided for supporting a frame 120 (FIG. 2). The frame 120 is provided for slidably accommodating trays 141 contained in the magazine pack 100, as described hereinafter.

Further, in the apparatus body 10 there is a tray transfer mechanism 400 which transfers the trays 141 in the frames 120 held by the hook mechanism 300 into the disc drive units 200 and returns them back into the frames 120 from the disc drive units 200.

The construction of the magazine pack 100 is explained below.

FIGS. 2 to 9 show the details of the magazine pack 100. Main constitutional members are described below by referring to FIGS. 2 to 5. A cover 110 is removably fitted to a bottom plate 101, with a plurality of frames 120 stacked between the bottom plate 101 and the cover 110.

The frames 120 are each provided with an engagement groove 121a, which matches the outline contour of a slider 130 and the tray 141 accommodating a disc 140. When the disc 140 is drawn into the disc drive unit 200, the slider 130 and tray 141 slider on the engagement groove 121a and move out of the frame 120.

The slider 130 and tray 141 are each provided with engagement projections 132, 142, which are kept engaged on the same plane. When the disc 140 is clamped on the disc drive unit 200, the engagement projections 132, 142 become disengaged from each other by lowering the tray 141.

FIGS. 6 to 9 show the cross section of the magazine pack 100 and its disassemble state. When the cover 110 is fitted to the bottom plate 101, engagement projections 102 of the bottom plate 101 fit into engagement recesses 111 formed at the lower end of the cover 110.

The bottom plate 101 has three erect pins 103, which, when the bottom plate 101 and the cover 110 are fitted together, pass through holes 144 of each frame 120, with their ends engaging with engagement recesses 112 formed inside the cover 110.

This prevents the frames 120 from deviating from each other when they are separated.

The lowest frame 120 is supported on support portions 104 projecting from the bottom plate 101. Each frame 120 is provided at the periphery with an inclined projection 121 and a stepped inclined portion 122. When the frames 120 are accommodated in the magazine pack 100, their inclined projections 121 and stepped inclined portions 122 are stacked together.

A center portion of the tray 141 has an insertion hole 145 through which a turntable 202 described later passes when the disc is clamped. The disc 140 in this embodiment is an optical disc, whose central portion is attracted by a magnet on the turntable 202 during clamping.

Figure 10:
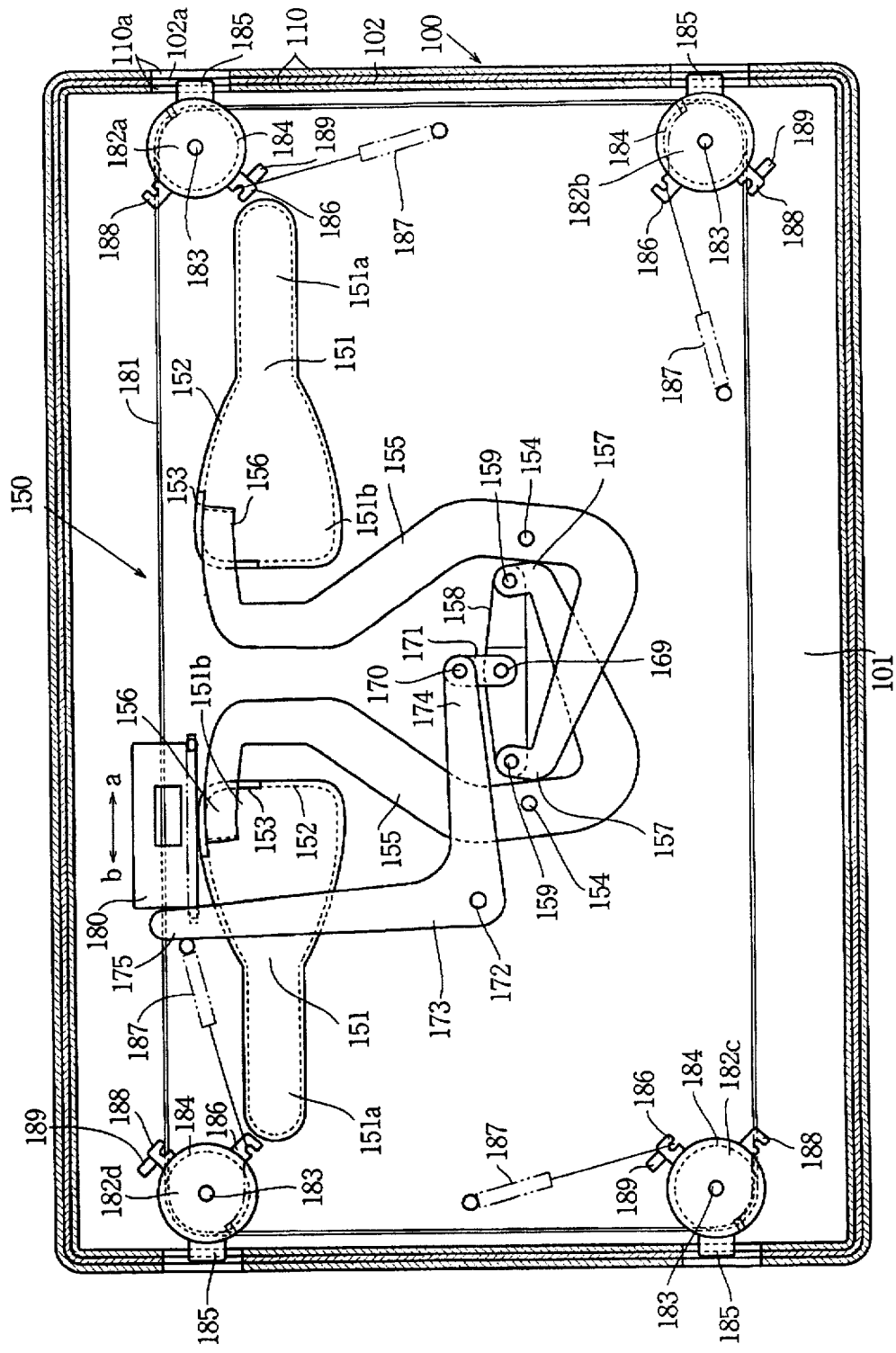
FIG. 10 is a plan view of the lock mechanism to block the frames in the magazine pack of FIG. 2 from becoming separated.

FIG. 10 shows the bottom plate 101 of the magazine pack 100, as seen from above, in a locked state in which the cover 110 mounted on the bottom plate 101 is locked to the bottom plate 101 by a lock mechanism 150.

A pair of loading grooves 151 of the lock mechanism 150 are formed on the underside of the bottom plate 101 by walls 152, respectively. Each groove 151 has a narrow portion 151a and a wide portion 151b. The wall 152 has an opening 153 at the wide portion 151b. A pair of arms 155 are pivotally supported on shafts 154, respectively. A front end 156 of the arm 155 is inserted in the opening 153.

When the lock mechanism 150 is unlocked, a roller 165 (FIG. 11) of each magazine loading mechanism 160 (FIG. 12) is pressed against the front end 156 of the arm 155. A rear end 157 of each arm 155 is pivotally connected to a connecting arm 158 through a shaft 159 as a fulcrum.

A shaft 169 mounted at the center of the connecting arm 158 extends to the upper side of the bottom plate 101. The shaft 169 is rotatably fitted with a connecting arm 171 having a shaft 170. The shaft 170 is rotatably fitted with an end 174 of a rotating lever 173 that is rotatable about a shaft 172.

The other end 175 of the rotating lever 173 abuts on an end of a moving body 180 which can move in the directions of arrows a and b. A belt 181 is passed through the moving body 180. The belt 181 is wound around four pulleys 182a–182d. Each of the pulleys 182a–182d has teeth 184 with which the belt 181 is engaged, and rotatable about shaft 183 mounted on the bottom plate 101. The pulleys 182a–182d are rotated clockwise and counterclockwise as the belt 181 moves in the directions of arrows a and b.

Lock pieces 185 are provided on the periphery of pulleys 182a–182d to fit into lock grooves 102a, 110a formed in the engagement projection 102 of the bottom plate 101 and in the lower end portion of the cover 110. This locks the cover 110 and the bottom plate 101. An engagement portion 186 provided on the periphery of each of the pulleys 182a–182d is connected with one end of a spring 187, which urges each of the pulley 182a–182d counterclockwise. Further, the outer periphery of each of the pulleys 182a–182d is also provided with a stopper piece 188, which abuts against a projection 189 erected on the bottom plate 101 to stop the pulley rotation at a predetermined position. In the figure, engagement portions 186 of the pulleys 182a, 182c located at the upper right and lower left engage with the projections 189 because of their locations.

Figure 11:
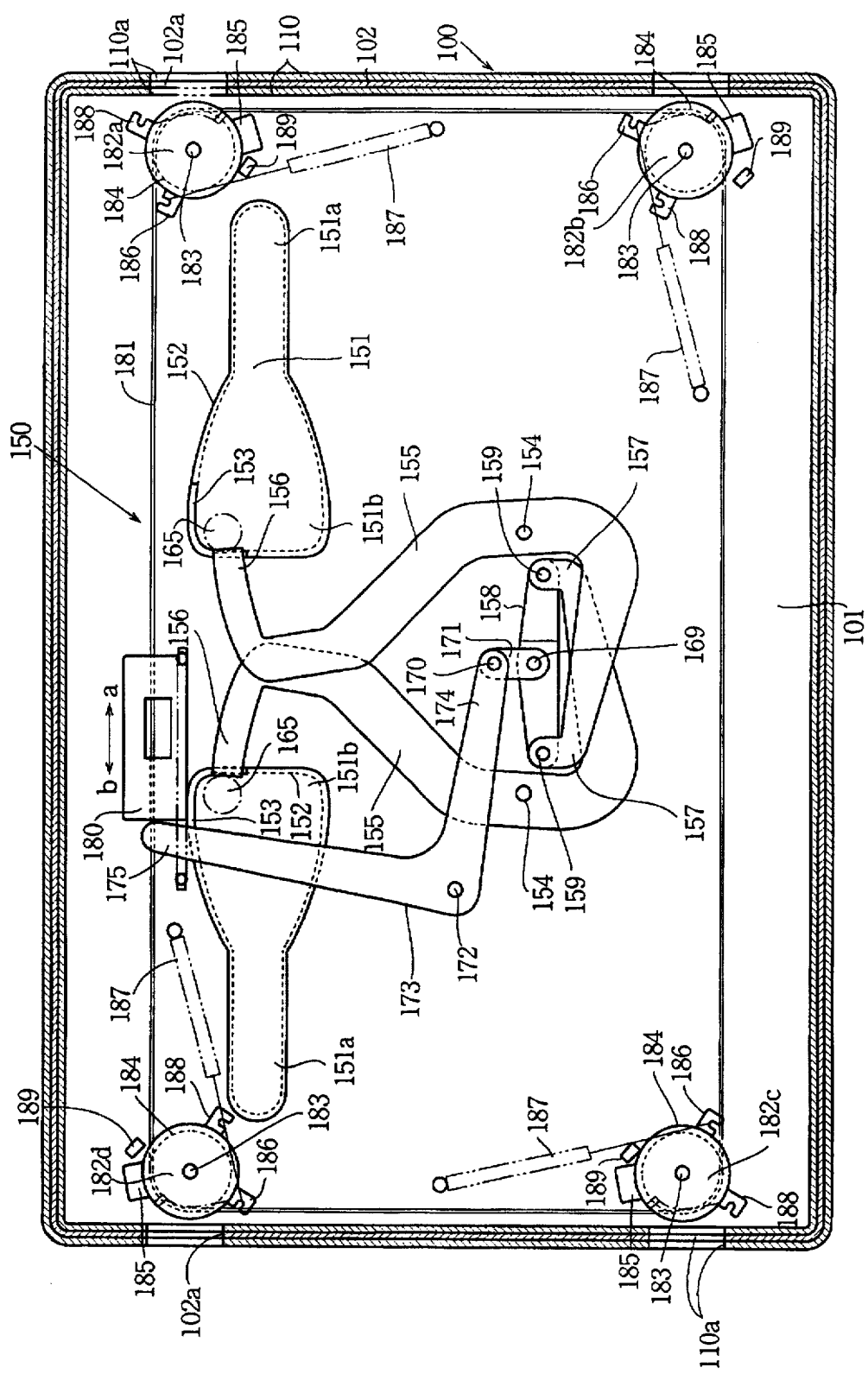
FIG. 11 is a plan view of the lock mechanism of FIG. 10 in unlocking state.

FIG. 11 shows the unlocked state of the lock mechanism 150.

In FIG. 10, the roller 165 fitted in the loading groove 151 moves along the wall 152. When it reaches the wide portion 151b, the final position, it abuts against the front end 156 of the arm 155, causing the arm 155 to rotate clockwise or counterclockwise about the shaft 154. This in turn causes the connecting arm 158 attached to the rear end 157 of the arm 155 to be pulled downward in the figure and also the connecting arm 171 to be drawn in the same direction, with the result that the rotating lever 173 rotates clockwise about the shaft 172.

As the rotating lever 173 rotates, the other end 175 of the rotating lever 173 pushes the end of the moving body 180 in the direction of arrow a to move the belt 181 in the same direction, causing the pulleys 182a–182d in mesh with the belt 181 to rotate clockwise, which in turn causes the lock pieces 185 provided on the periphery of the pulleys 182a–182d to disengage from the lock grooves 102a, 110a formed in the engagement projection 102 of the bottom plate 101 and in the lower end portion of the cover 110. Now, the lock mechanism 150 is unlocked.

Next, the magazine loading mechanism 160 which loads the magazine pack 100 into the apparatus body 10 will be explained.

Figure 12:
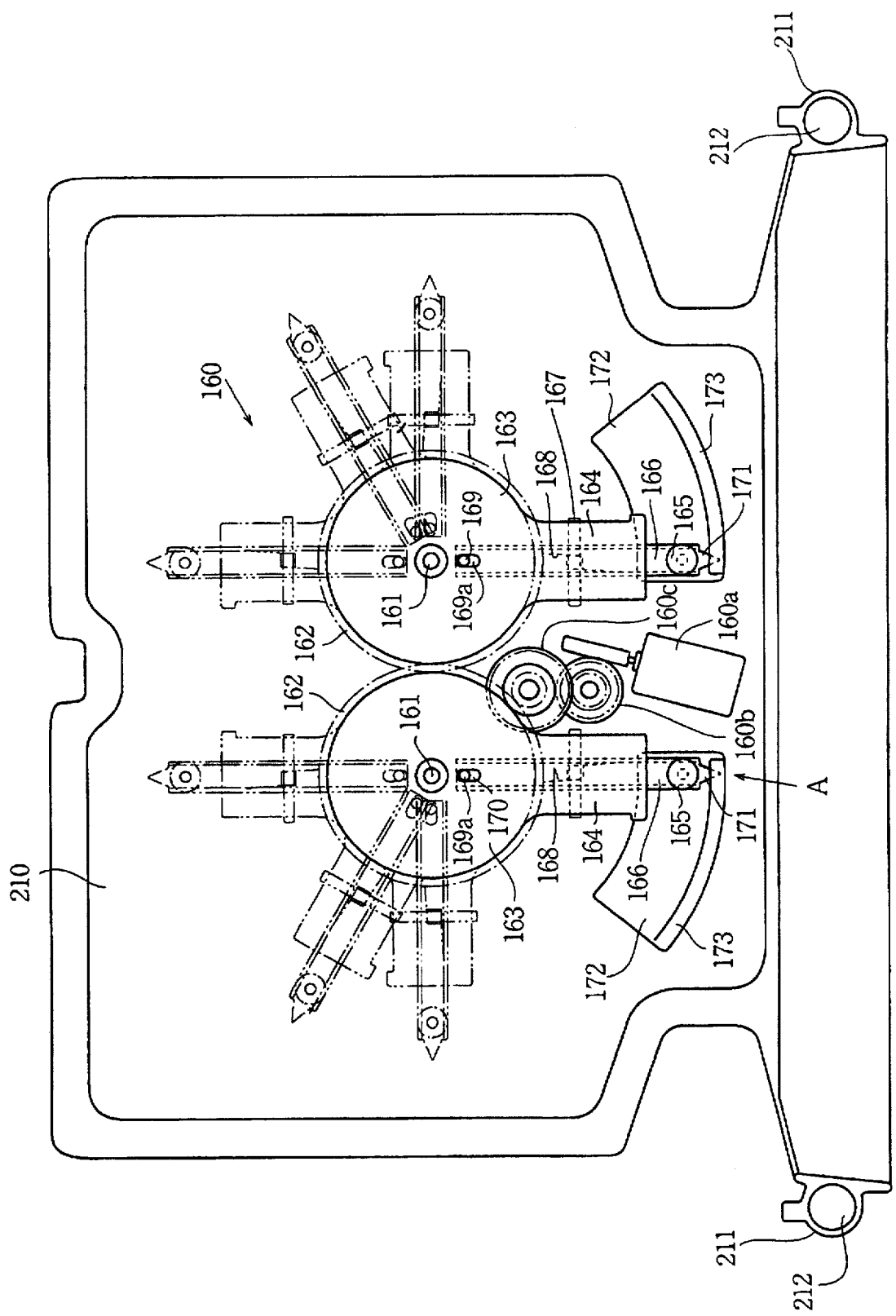
FIG. 12 is a plan view of a magazine loading mechanism installed on the carriage base to move the magazine pack of FIG. 4 to each of the disc drive unites.

FIG. 12 shows the detail of the magazine loading mechanism 160. In the figure, the arrow A represents the direction in which the magazine pack 100 is insetted manually through the magazine pack insertion opening 20. A pair of rotating bodies 163 rotatable about shafts 161 are mounted on the carriage base 210. Thread 162 of each rotating body 163 are meshed with each other and the rotating body 163 is rotated by the driving force of a drive motor 160a transmitted through transmission gears 160b, 160c.

Each rotating body 163 is provided with an arm portion 164. On the back of the arm portion 164 there is provided an arm 166, which has the roller 165 at the front end, and is rotatable about a shaft 167 and has its front end urged upward by a spring 168.

The rear end of the arm 166 is provided with a stopper pin 169 which defines the stop position of the magazine pack 100 inserted in the direction of arrow A. The stopper pin 169 projects from a hole 169a formed in the rotating body 163.

An engagement piece 171 at the front end of each arm 166 engages, from below, a cam portion 173 of a guide member 172 mounted on the carriage base 210 and is rotated downwardly against the force of the spring 168, thus preventing the roller 165 of the arm 166 from projecting upward. With this construction, when the magazine pack 100 is inserted, the arm 166 is kept out of the way. Further, because the stopper pin 169 is projected from the hole 169a of the rotating body 163, the magazine pack 100 is stopped at a predetermined position.

Figure 13:
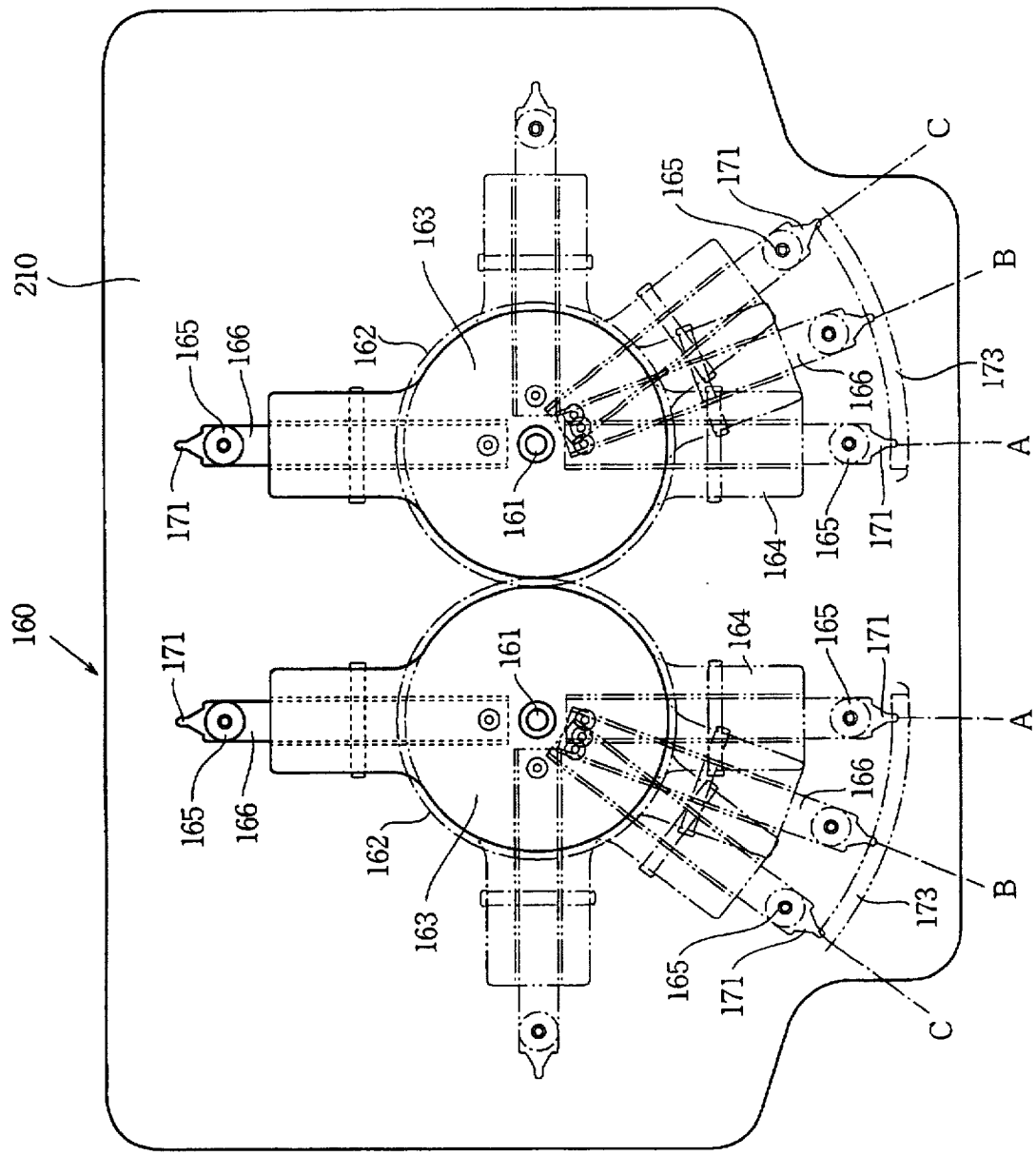
FIG. 13 is a plan view of a magazine loading mechanism installed on the carriage base to move the magazine pack of FIG. 2 to each of the disc drive units.

FIGS. 13 and 14 show the rotating bodies 163 and the arms 166 in the rotating state. From the position A toward the position C, the height of the cam portion 173 is progressively increased, so that the front end of each arm 166 is gradually pushed up. When the front end of the arm 166 disengages from the cam portion 173, it engages the lower end of the arm portion 164 and is blocked from further upward motion against the force of the spring 168. The arm 166 is thus held almost horizontal.

As the arm 166 rises, the roller 165 also is raised and inserted in the loading groove 151 of the magazine pack 100. Now, the magazine pack 100 can be carried.

At the same time, the stopper pin 169 at the rear end of each arm 166 is retracted from the hole 169a, so that the magazine pack 100 can be drawn to the rear side of the apparatus body without trouble.

Figure 16:
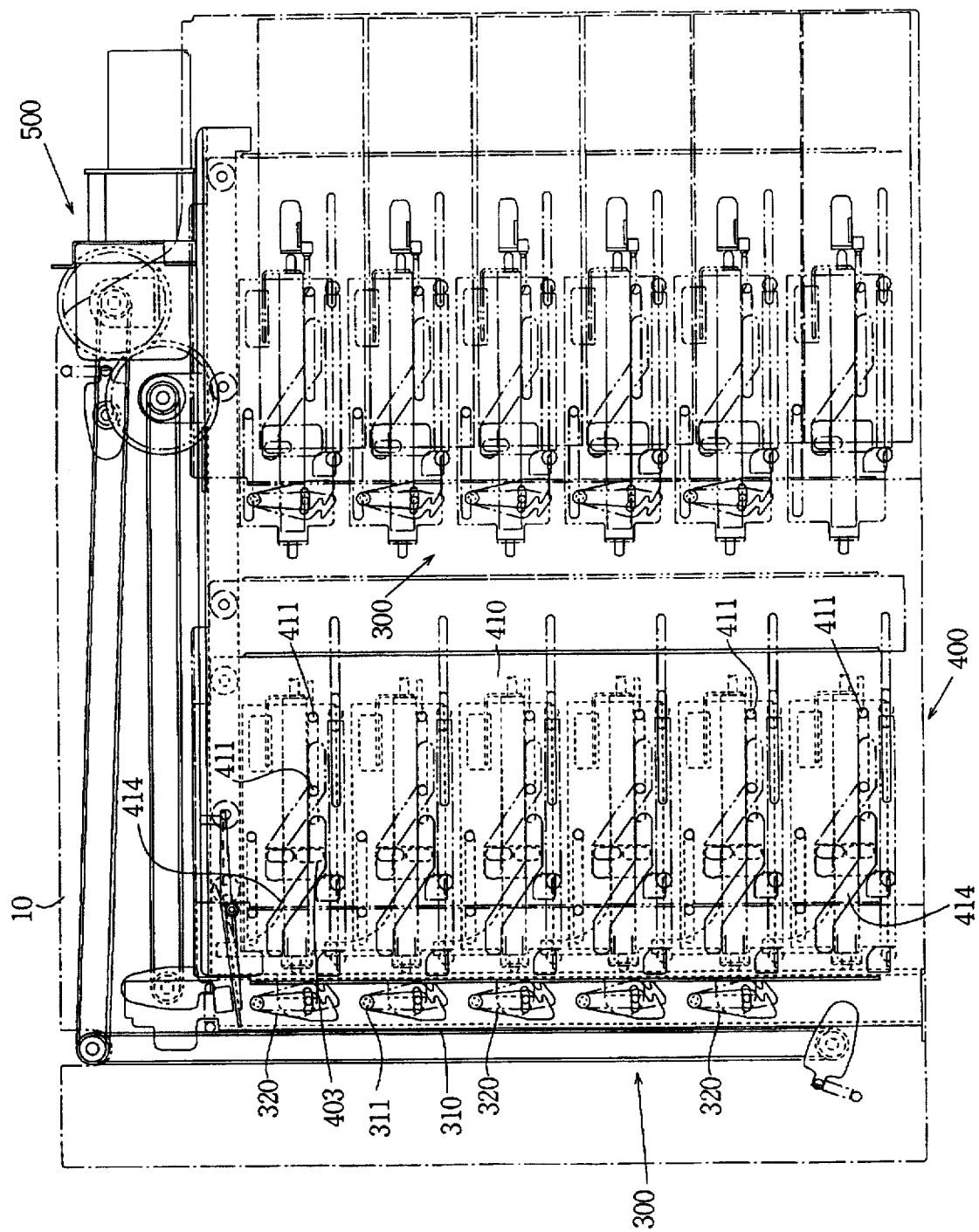
FIG. 16 is a front view showing the internal structure of the information recording and reproducing apparatus of FIG. 1.

Referring to FIGS. 15 and 16, explanation will be made about the hook mechanism 300 for separately holding the individual frames 120 contained in the magazine pack 100 and also about the tray transfer mechanism 400 for moving the trays 141 accommodated in the frames 120.

FIGS. 15 and 16 show details of the hook mechanism 300 and the tray transfer mechanism 400.

The hook mechanism 300 is installed in the travel space 170A (FIG. 1) on the carriage base 210 in the apparatus body 10. The hook support members 310 for rotatably supporting the hook members 320 are provided at opposite sides and at a location of a central location in the travel space 170A. The detail of the hook mechanism 300 will be described later.

Figure 17:
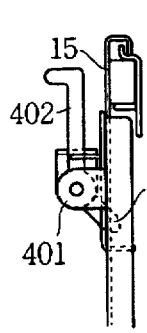
FIGS. 17a through 17h are schematic diagrams showing the operation of the tray transfer mechanism of FIG. 1.
Figure 17:
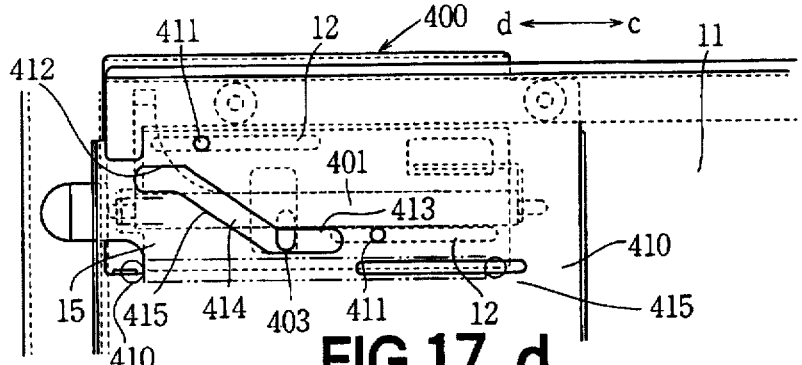
Figure 17:
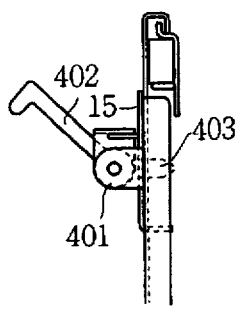
Figure 17:
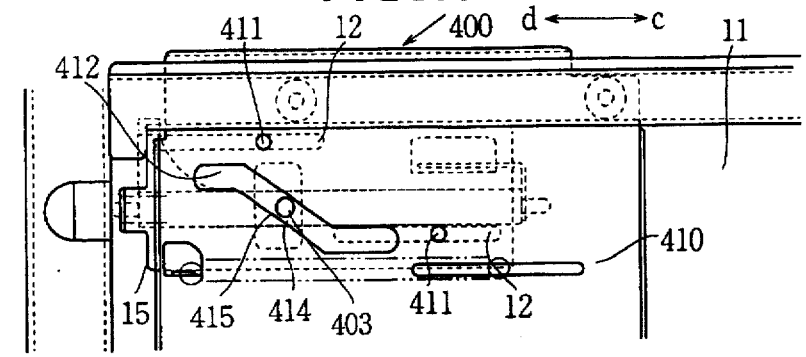
Figure 17:
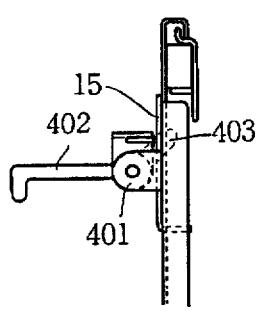
Figure 17:
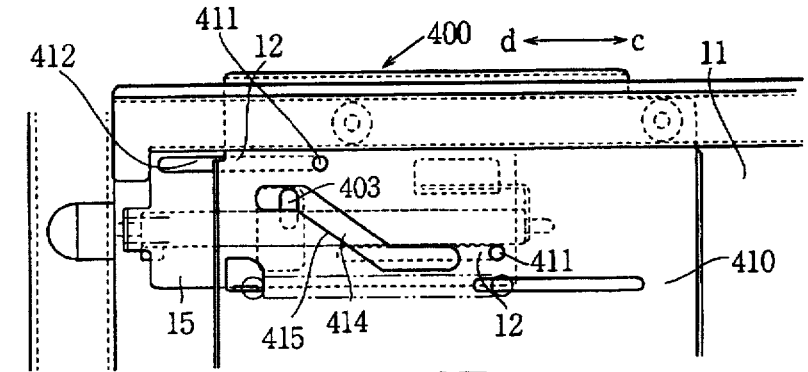
Figure 17:
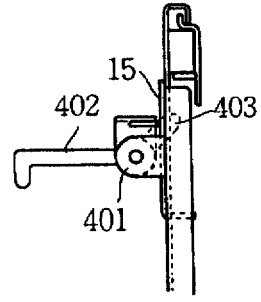
Figure 17:
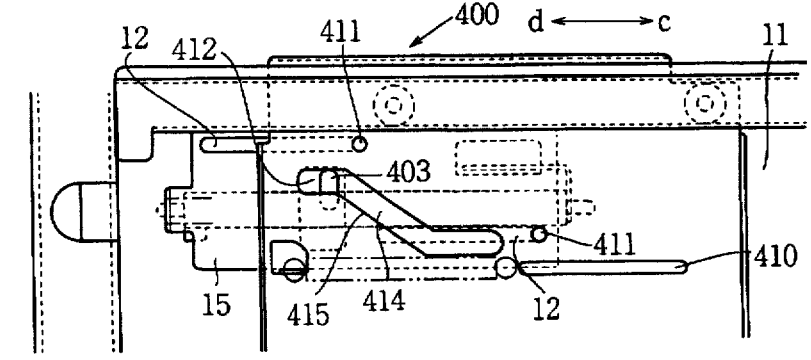

The tray transfer mechanisms 400 are installed on both sides in the apparatus body 10. In FIG. 17, sliders 410 are mounted slidably in the longitudinal direction of the apparatus body 10, i.e., in the direction of arrows c, d. On each slider 410 a moving base 15 is mounted movable in the direction of arrows c, d. The slider 410 has a projecting guide pin 411 which slidably engages with a longitudinally elongated guide slot 12 formed in the moving base 15. The moving base 15 has a rotating body 401 supported thereon. The rotating body 401 is rotable about the axis thereof and has an L-shaped hook 402 to be engaged in an engagement groove 131 (FIG. 2) formed in the slider 130 of the magazine pack 100. Furthermore, the moving base 15 has an engagement member 403 engaged in a cam groove 415 formed in the slider 410. There is provided a friction means between the slider 410 and the moving base 15. With this construction, when the slider 410 moves in the direction c, the rotating body 401 is to be rotated by the cam groove 415 in an early period of the movement of the slider.

Namely, the cam groove 415 has an upper cam 412, a lower cam 413 and an inclined cam 414. When the slider 410 moves in the direction of arrow c, the engagement member 403 is displaced vertically giving the rotating body 401 a rotating force.

Here, when the slider 410 is moved in the direction of arrow c by a driving mechanism 500 having means for driving the slider 410, the engagement member 403 is upwardly moved. Thus, the hook 402 is downwardly rotated (FIG. 17g), the guide pin 411 of the slider 410 abuts against the end of the guide slot 12 of the moving base 15, causing the moving base 15 to move together in the same direction.

The operation of the information recording and reproducing apparatus is described with reference to FIG. 18 through FIG. 33.

Figure 25:
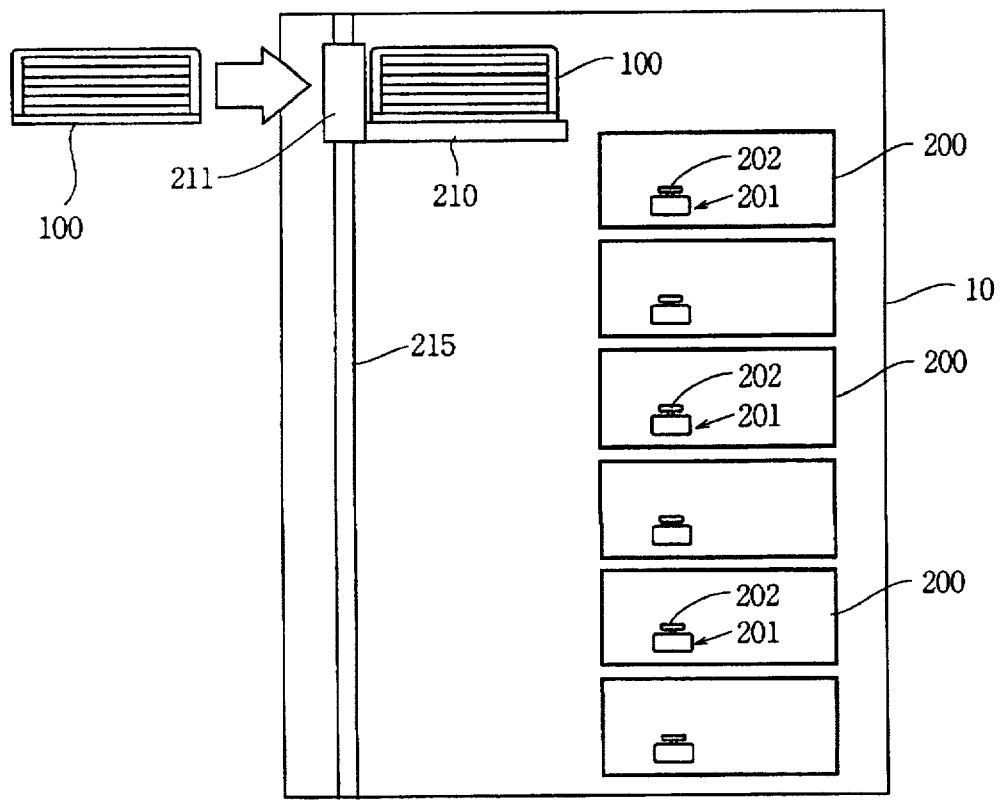
FIG. 25 is a schematic diagram showing how the magazine pack of FIG. 2 is loaded.

The carriage base 210 is located at the uppermost position (FIG. 25). The magazine pack 100 is inserted into the apparatus body 10 through the magazine pack insertion opening 20. At this time, as mentioned above, because the engagement piece 171 at the front end of each arm 166 of the magazine loading mechanism 160 engages with the cam portion 173 of the guide member 172 (FIG. 12) on the carriage base 210 and is rotated downwardly against the force of the spring 168 to limit the projection of the roller 165 of the arm 166, the magazine pack 100 can be smoothly inserted without being interfered with by the roller 165. The stop position of the magazine pack 100 after being inserted is determined by the stopper pin 169 which projects from the hole 169a of the rotating body 163.

Figure 18:
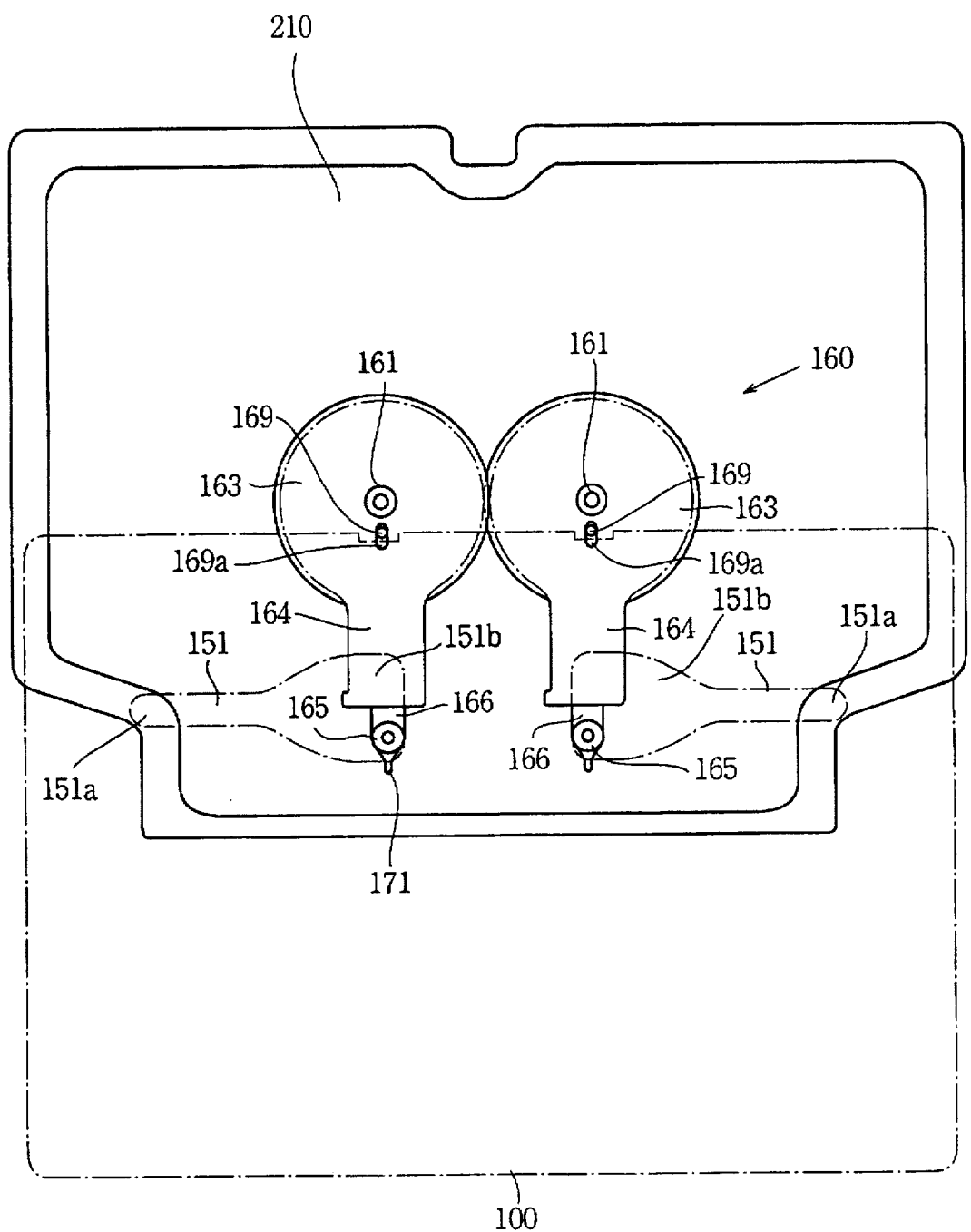
FIG. 18 is a plan view showing the operation of the magazine loading mechanism of FIG. 12.
Figure 19:
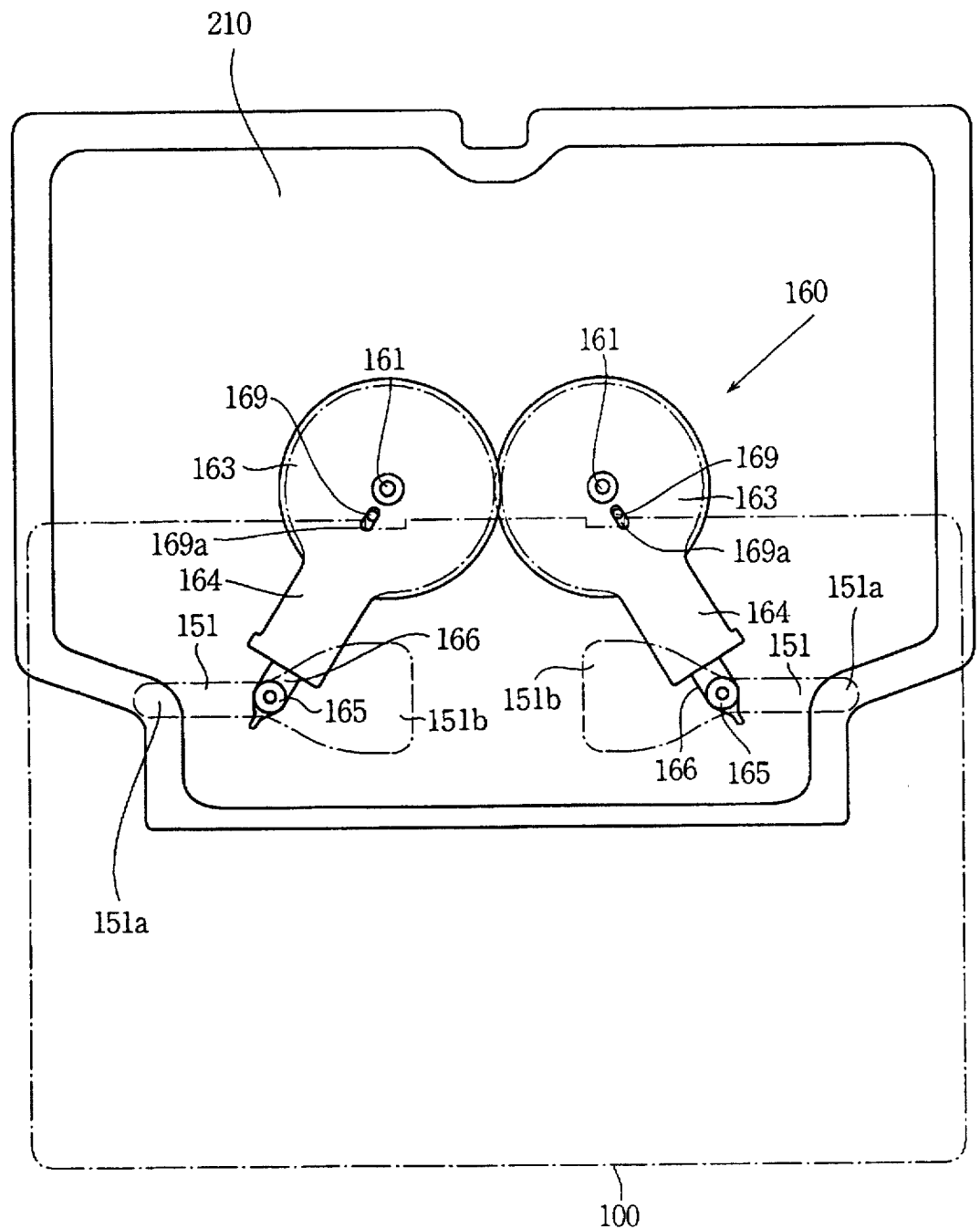
FIG. 19 is a plan view showing the operation of the magazine loading mechanism of FIG. 12.

At this time, the roller 165 is located below the wide portion 151b of the loading groove 151, as shown in FIG. 18. When the insertion of the magazine pack 100 is detected by a sensor switch not shown, the drive motor 160a is switched on to rotate the rotating bodies 163.

As the rotating body 163 turns, the engagement piece 171 at the front end of each arm 166 slides on the underside of the cam portion 173 of the guide member 172 on the carriage base 210 and is progressively pushed up by the force of the spring 168 as shown in FIG. 14. When the roller 165 reaches a position shown in FIG. 19, the engagement piece 171 at the front end of the arm 166 disengages from the cam portion 173 of the guide member 172 on the carriage base 210, causing the roller 165 to insert in the loading groove 151 of the lock mechanism 150 provided in the magazine pack 100. At this time, the rotation of the arm 166 due to the force of the spring 168 causes the stopper pin 169 attached to the rear end of the arm 166 to be retracted from the hole 169a.

Figure 20:
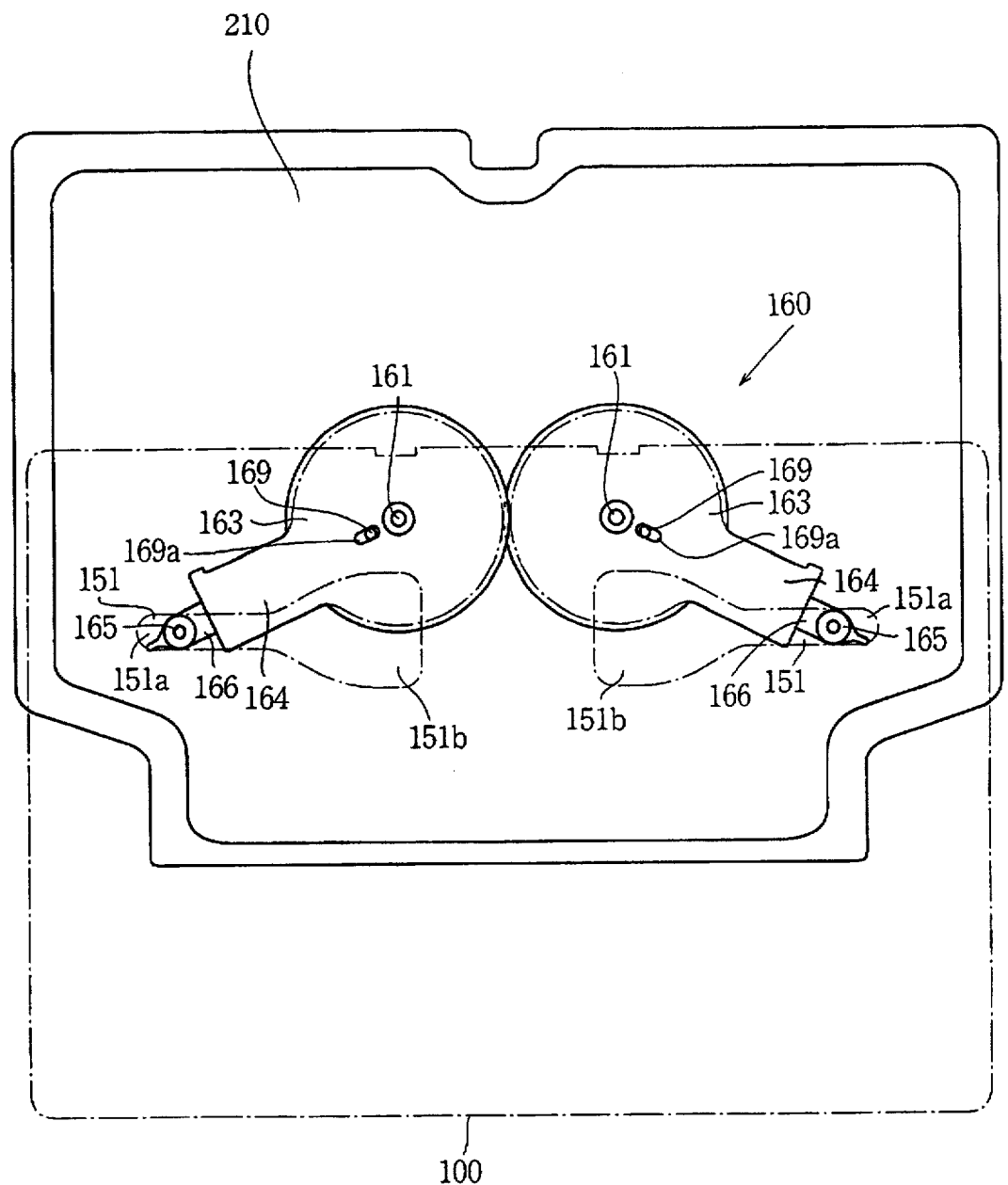
FIG. 20 is a plan view showing the operation of the magazine loading mechanism of FIG. 12.
Figure 21:
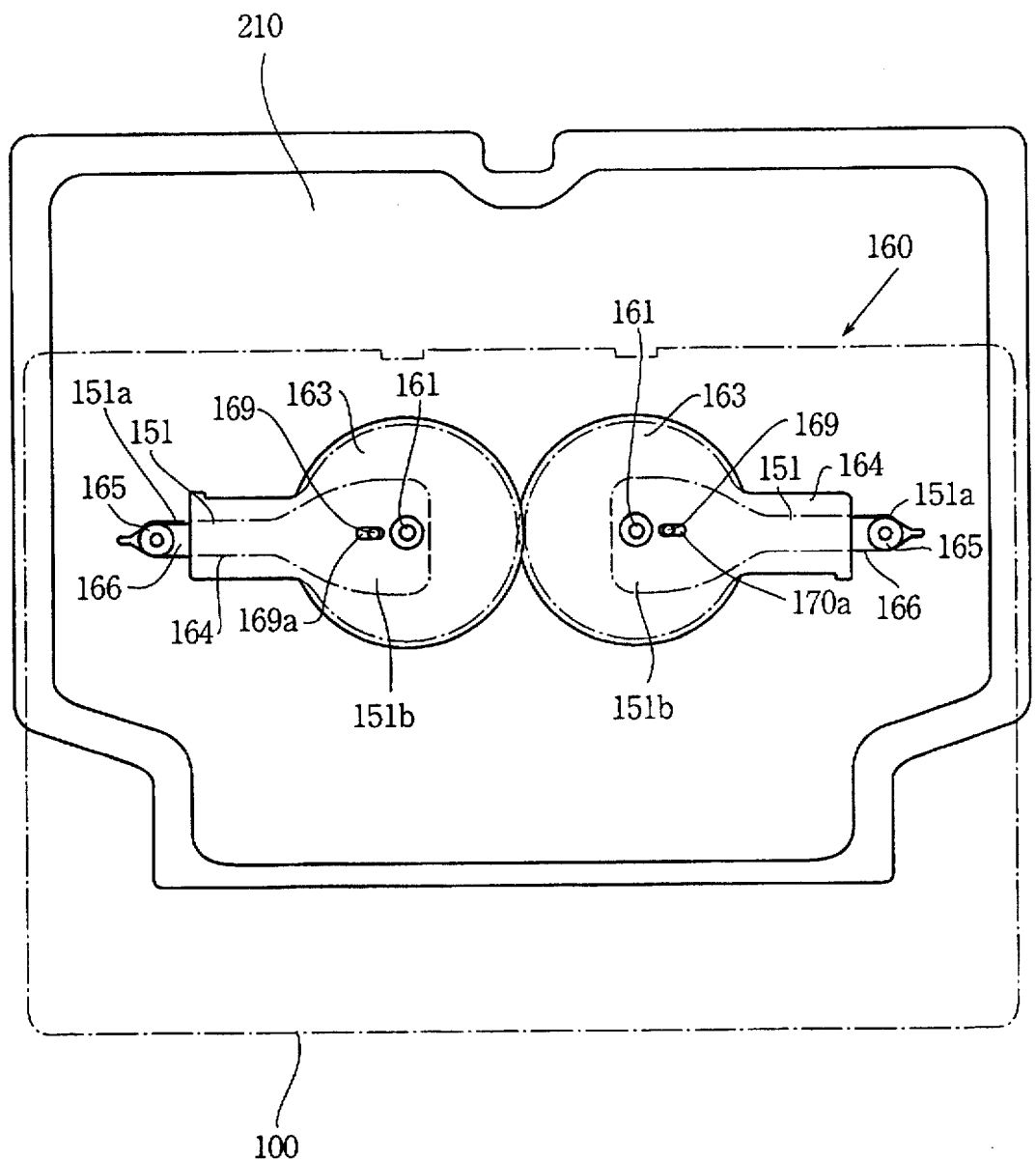
FIG. 21 is a plan view showing the operation of the magazine loading mechanism of FIG. 12.

When the rotating body 163 further continues to rotate, the roller 165 moves from the wide portion 151b of the loading groove 151 to the narrow portion 151a and slides through the narrow portion 151a toward the end portion, causing the magazine pack 100 to move gradually onto the carriage base 210, as shown in FIGS. 20 and 21. At this time, the amount of rotation of the two rotating bodies 163 reaches 90 degrees when they are in the condition of FIG. 21, and the rollers 165 reach the farthest part of the narrow portion 151a of the loading groove 151.

Figure 22:
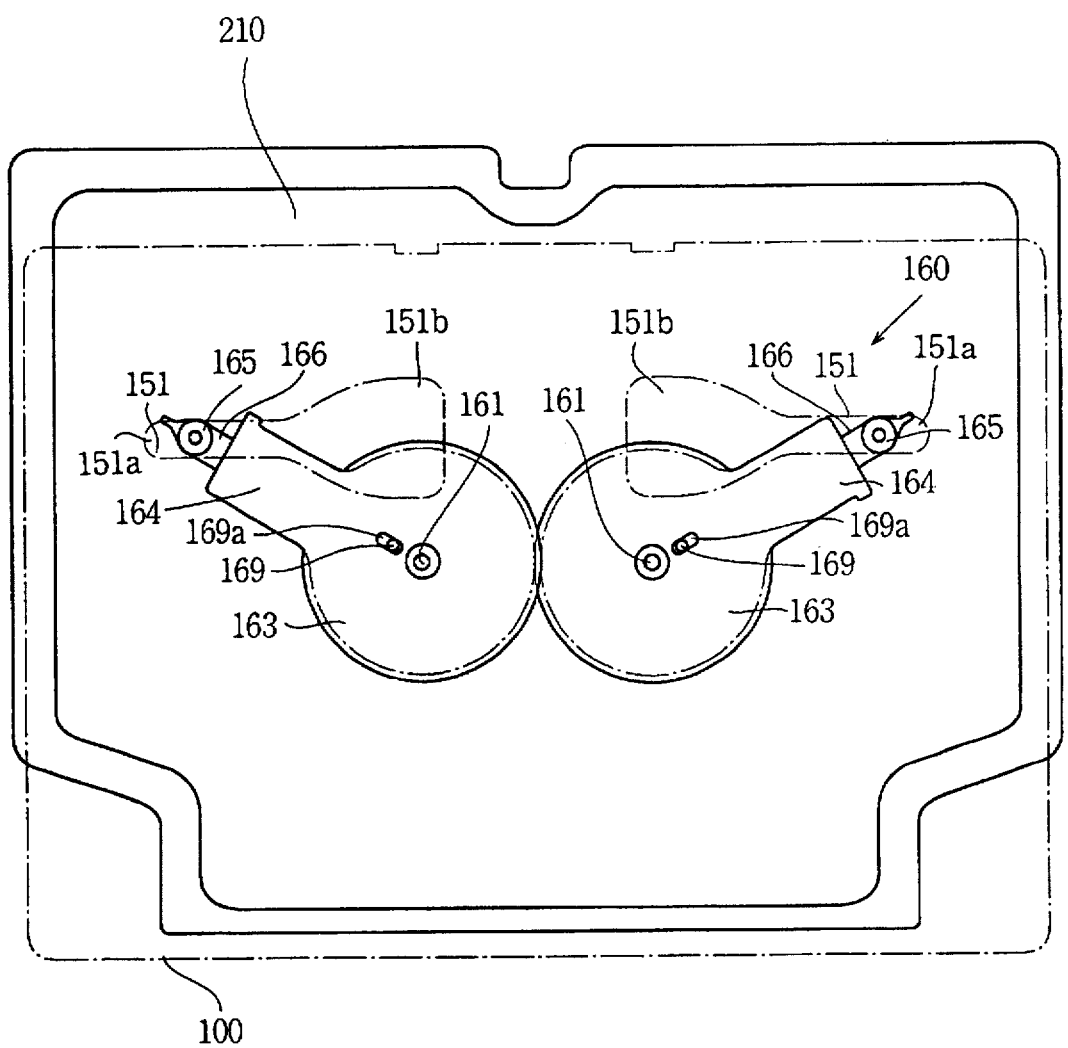
FIG. 22 is a plan view showing the operation of the magazine loading mechanism of FIG. 12.
Figure 23:
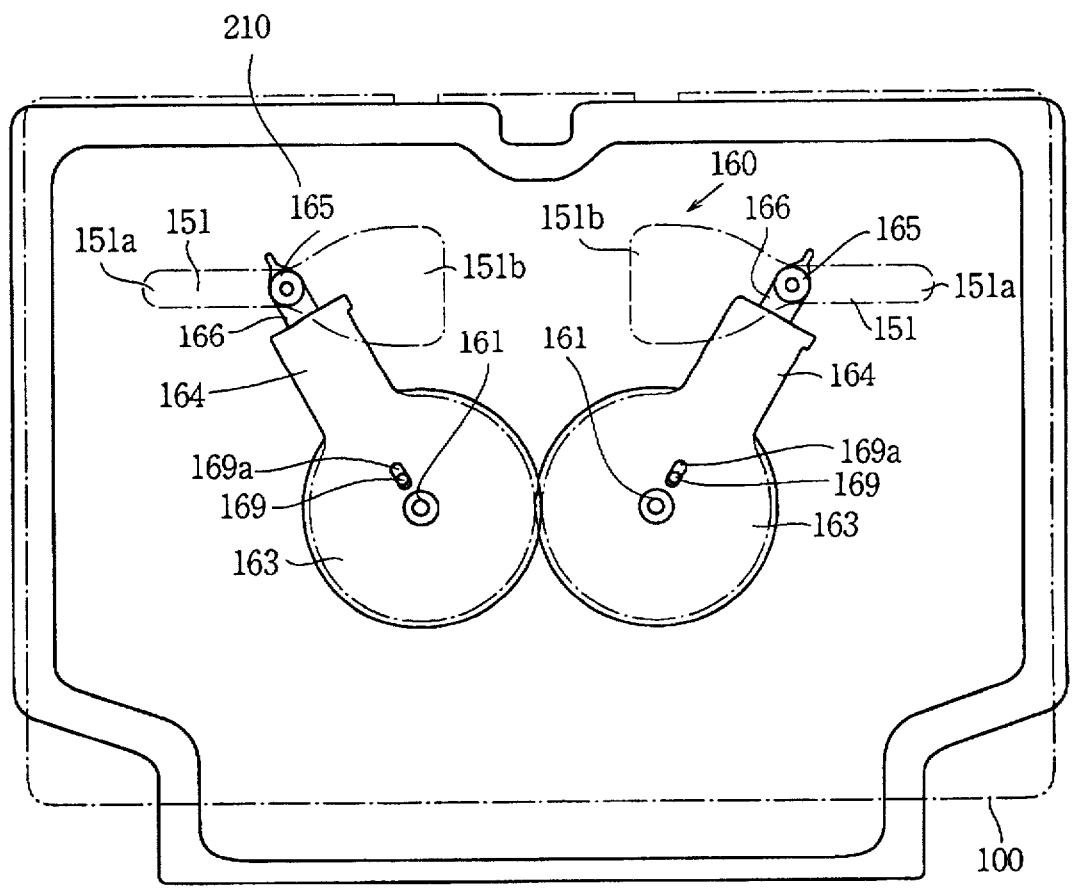
FIG. 23 is a plan view showing the operation of the magazine loading mechanism of FIG. 12.

If the rotating body 163 further continues its rotation from this state, the roller 165 slides from the farthest part of the narrow portion 151a of the loading groove 151 toward the wide portion 151b drawing in the magazine pack 100 further onto the carriage base 210, as shown in FIG. 22. When, as shown in FIG. 23, the roller 165 reaches a point between the narrow portion 151a and the wide portion 151b of the loading groove 151, the drawing in of the magazine pack 100 onto the carriage base 210 is completed.

As the rotating bodies 163 continue their rotation from this state, the rollers 165 move to the wide portions 151b of the loading grooves 151. When the two arms 166 rotate through 180 degrees, as shown in FIGS. 12 and 13, the rollers 165 abut against the front ends 156 of the arms 155 of the lock mechanism 150 provided to the bottom plate 101 of the magazine pack 100, as shown in FIG. 11, thereby unlocking the lock mechanism 150.

That is, each roller 165 engages and presses the front end 156 of the arm 155, rotating the arm 155 clockwise or counterclockwise about the shaft 154. This causes the connecting arm 158 attached at the rear end 157 of the arm 155 to be retracted downwardly in FIG. 11 and also the connecting arm 171 to be retracted in the same direction. As a result, the rotating lever 173 rotates clockwise about the shaft 172.

As the rotating lever 173 rotates, the other end 175 of the lever presses against the end of the moving body 180 in the direction of arrow a, causing the belt 181 to move in the same direction and the pulleys 182a–182d in mesh with the belt to rotate clockwise, with the result that the lock piece 185 provided on the periphery of each of pulleys 182a–182d disengages from the lock groove 102a, 110a formed in the engagement projection 102 of the bottom plate 101 and the lower end portion of the cover 110, unlocking the lock mechanism 150.

Figure 24:
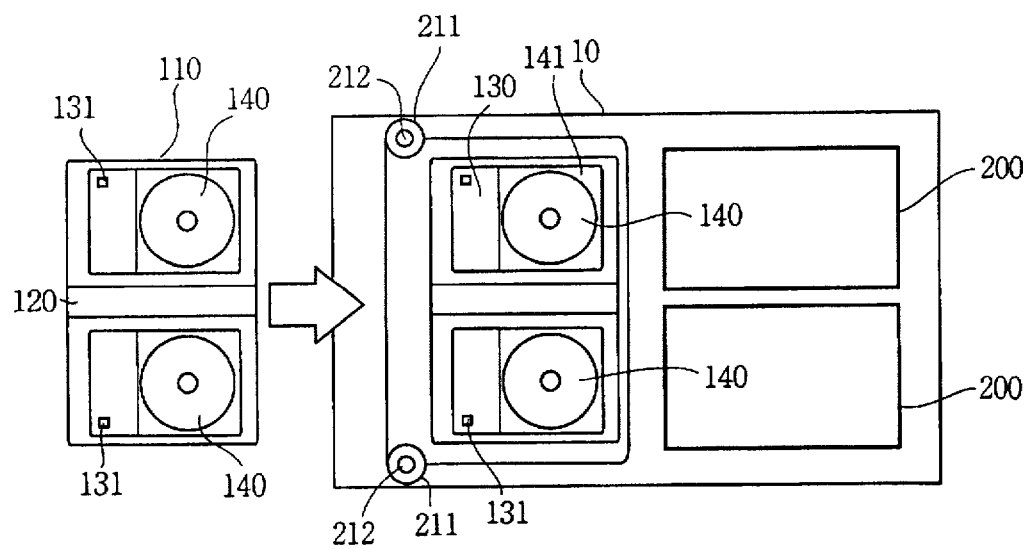
FIG. 24 is a schematic diagram showing how the magazine pack of FIG. 2 is loaded.

FIGS. 24 and 25 show the magazine pack 100 completely drawn onto the carriage base 210, as viewed from above and from the side of the apparatus body 10. After the magazine pack 100 has been transferred onto the carriage base 210, the magazine pack 100 is disassembled by the hook mechanism 300 as the carriage base 210 is lowered along the guide shaft 215.

Figure 32:
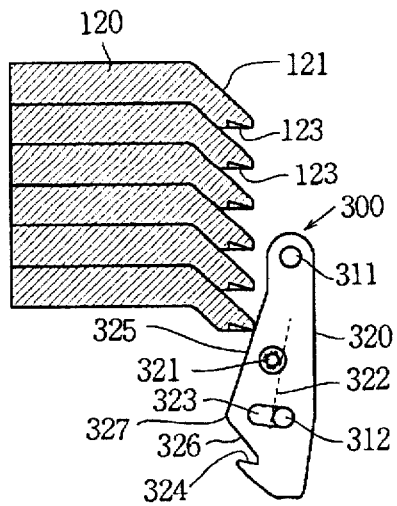
FIGS. 32a through 32f are schematic diagrams showing how the frames in the magazine pack are separated by the hook mechanism of FIG. 1.
Figure 32:
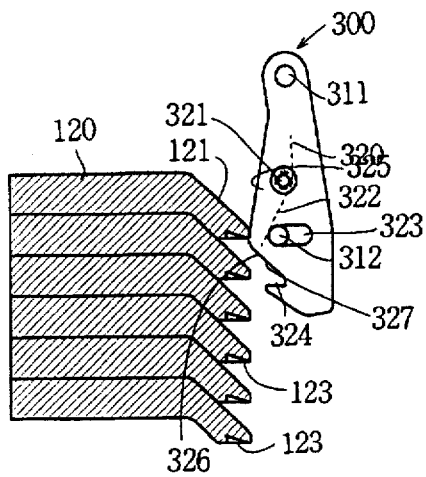
Figure 32:
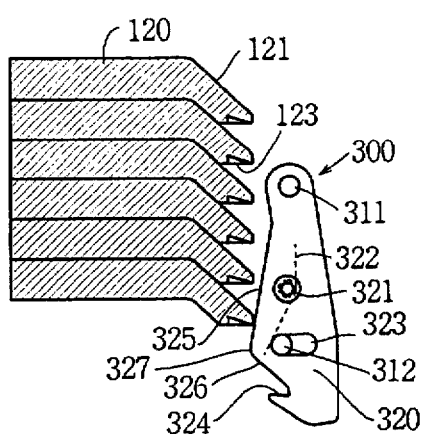
Figure 32:
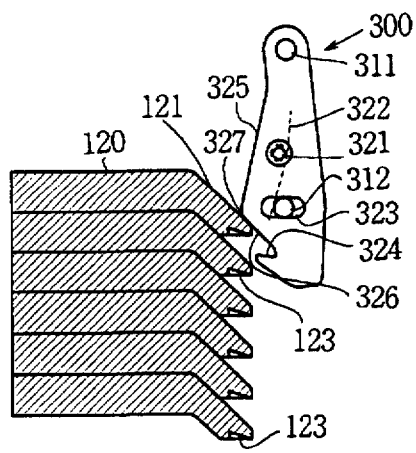
Figure 32:
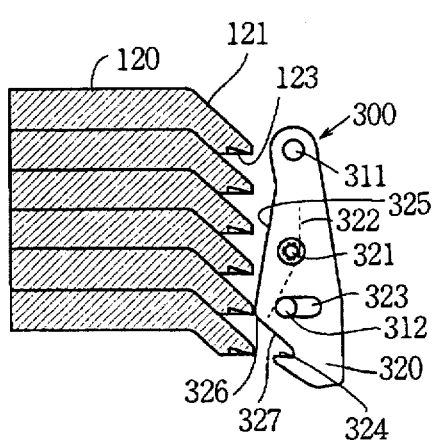
Figure 32:
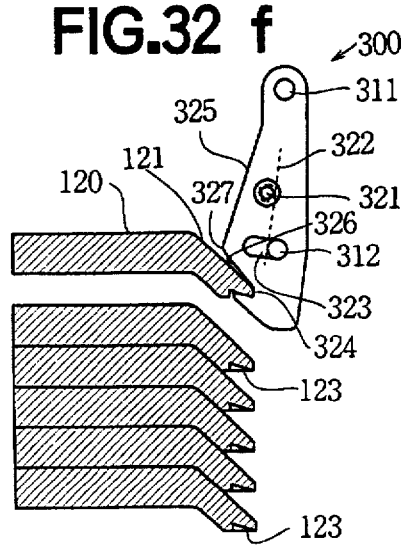
Figure 33:
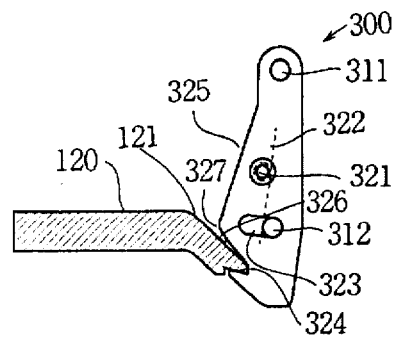
FIGS. 33a through 33d are schematic diagrams showing another embodiment of the information recording and reproducing apparatus of FIG. 1 with a different loading procedure.
Figure 33:
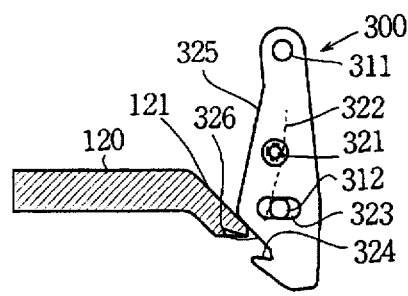
Figure 33:
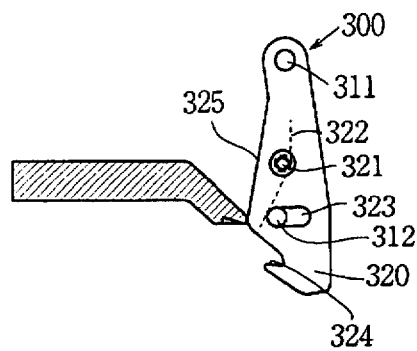
Figure 33:
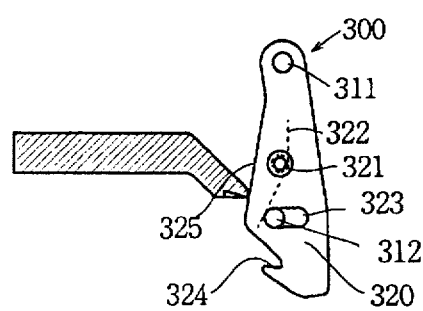
Figure 34:
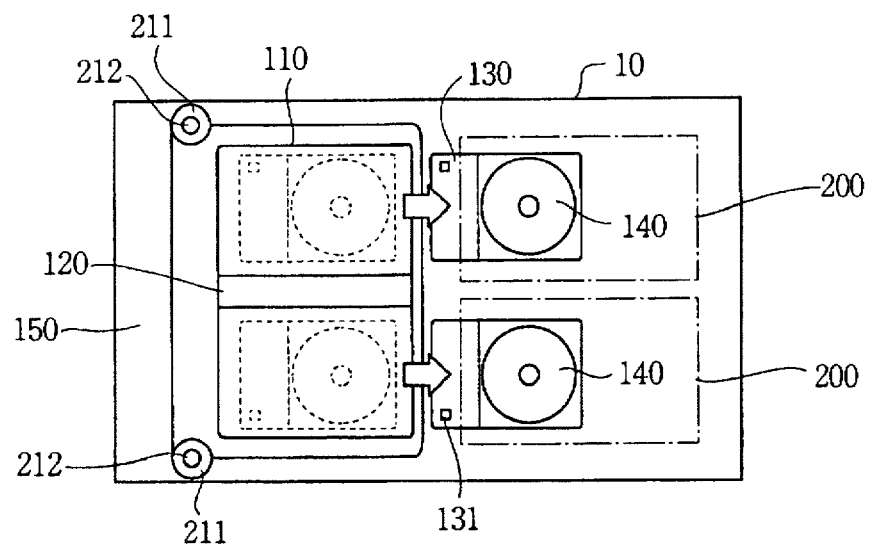
FIG. 34 is a schematic diagram showing the loading process of FIG. 33.

That is, as shown in FIGS. 16 and 32, the hook member 320 having a hook portion 324 is rotatably mounted on shafts 311 provided on the hook support member 310. Each of the hook members 320 is arranged on the hook support member 310 at a position corresponding to the disc intake port of the corresponding disc drive unit 200, as shown in FIG. 1.

A pin 312 provided on the hook support member 310 is slidably engaged with a slot 323 formed in the hook member 320. The amount of rotation of the hook member 320 is determined by the dimension of the slot 323. On a pin 321 provided on a central part of the hook member 320, a spring 322 is wound. One end of the spring 322 is secured to the hook member 320 and the other end is abutted against a pin 312. The spring 322 is provided to urge the hook member 320 toward the frame 120.

When the carriage base 210 carrying the magazine pack 100 starts moving downward, the lower end of the inclined projection 121 of the lowermost frame 120 inside the magazine pack 100 engages with an inclined portion 325 of the uppermost hook member 320, causing the hook member 320 to rotate counterclockwise against the force of the spring 322, as shown in FIG. 32b.

When the carriage base 210 moves further down, the lower end of the inclined projection 121 of the lowermost frame 120 rides over a vertex portion 327 of the inclined portion 325 of the hook member 320 and disengages from the inclined portion 325, as shown in FIGS. 32b and 32c. This is immediately followed by the lower end of the inclined projection 121 of the next lower frame 120 abutting against the inclined portion 325 of the hook member 320 (FIG. 32c), preventing the hook member 320 urged by the spring 322 from returning.

In this way, the lower ends of the inclined projections 121 of the frames 120 successively abut against the inclined portion 325 of the hook member 320, thereby allowing the frames 120 to move past the hook member 320 without the engagement groove 123 at the lower end of the inclined projection 121 of each frame 120 being engaged by the hook portion 324 of the hook member 320.

Then, as shown in FIG. 32d, when the lower end of the inclined projection 121 of the uppermost frame 120 abuts against the inclined portion 325 of the hook member 320 and rides over the vertex portion 327 of the inclined portion 325, the force acting on the inclined portion 325 to block the hook member 320 from returning no longer exists, so that the spring 322 forces the hook member 320 back, causing the lower end of the inclined projection 121 of the uppermost frame 120 to slide down an inclined portion 326 of the hook member 320. As a result, the engagement groove 123 of inclined projection 121 engages the hook portion 324 of the hook member 320.

When the carriage base 210 continues its downward movement from this state, the second frame 120 is separated from the uppermost frame 120 by its own weight, leaving the top frame separately held by the hook member 320.

In this way, as the carriage base 210 moves down, the frames 120 are successively separated and held by the hook members 320, starting with the top frame. After all the frames 120 are separately held, completing the disassembly of the magazine pack 100, the tray transfer mechanism 400 begins to pull the trays into the disc drive units 200.

That is, as shown in FIG. 17, when the slider 410 of the tray transfer mechanism 400 is moved in the direction of arrow c, the engagement member 403 located at the lower cam 413 of the cam groove 415 is pushed up to the upper cam 412 by the inclined cam 414.

This causes the rotating body 401 mounted on the moving base 15 to rotate to bring the hook 402 down, putting the front end of the hook 402 into the engagement groove 131 formed in the slider 130 of the magazine pack 100. When the slider 410 is further moved in the direction of arrow c from this state, the guide pin 411 of the slider 410 engages the end of the guide slot 12, causing the moving base 15 to move in the same direction.

Figure 4:
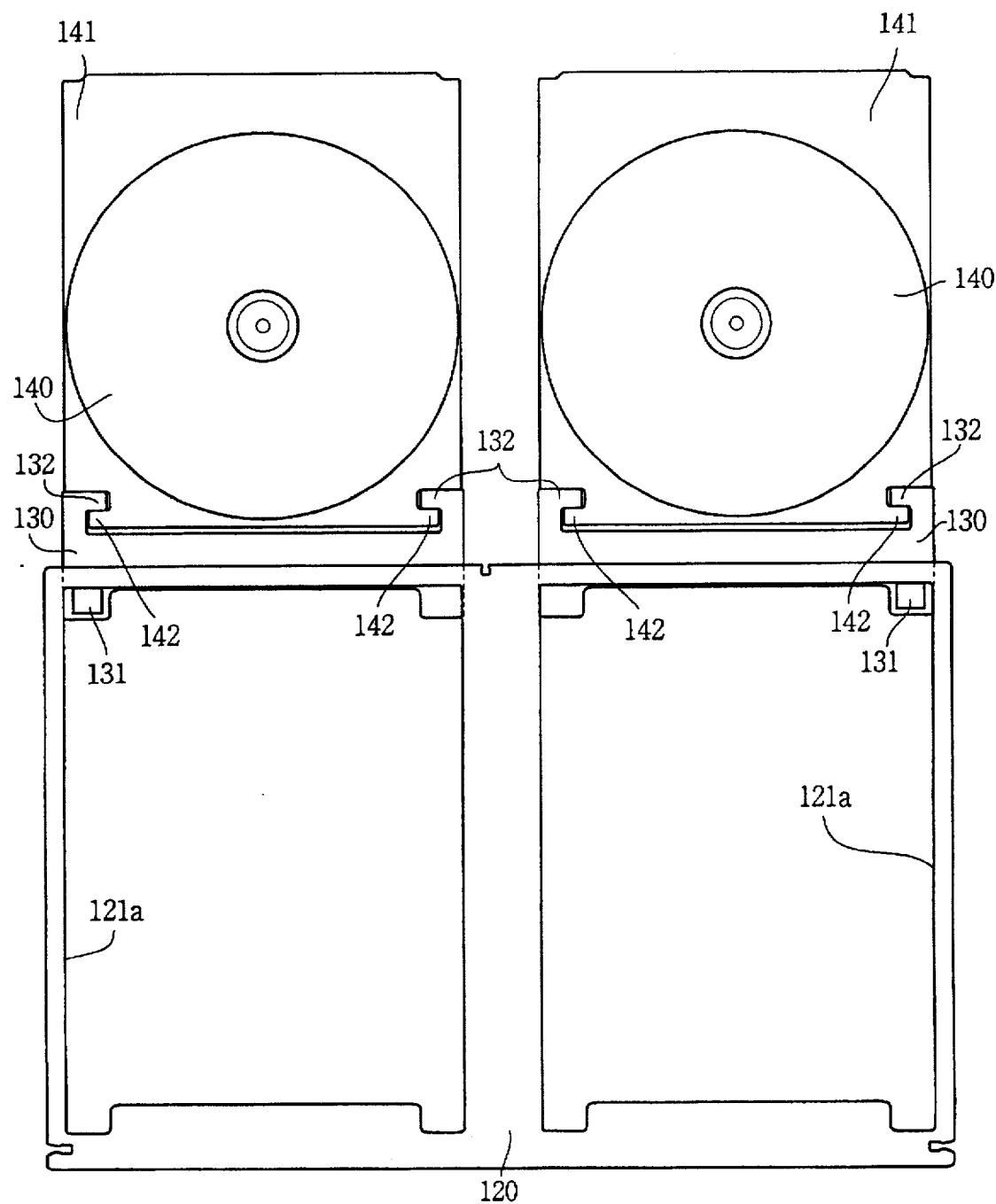
FIG. 4 is a plan view of the tray drawn out of the frame of FIG. 3.
Figure 5:
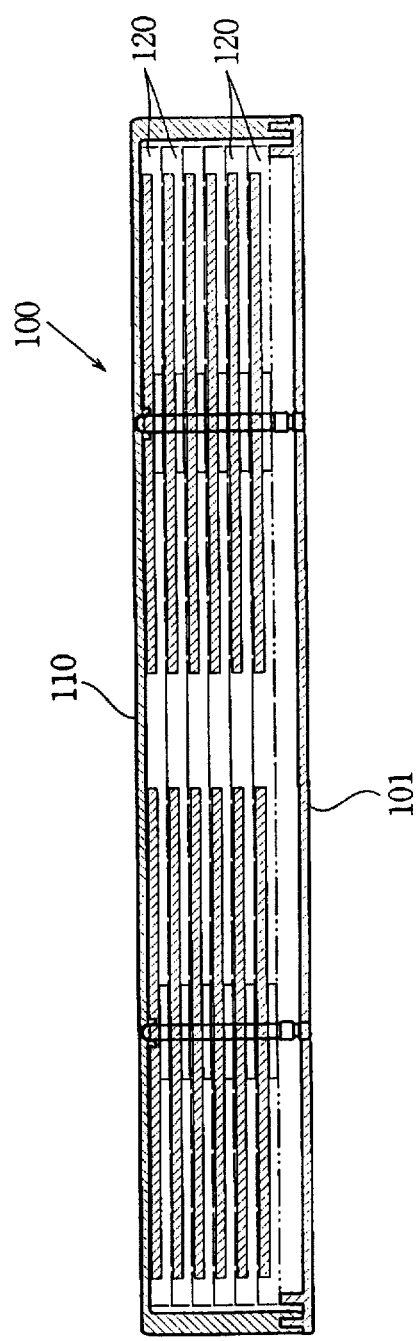
FIG. 5 is a cross section of the magazine pack of FIG. 2.
Figure 6:
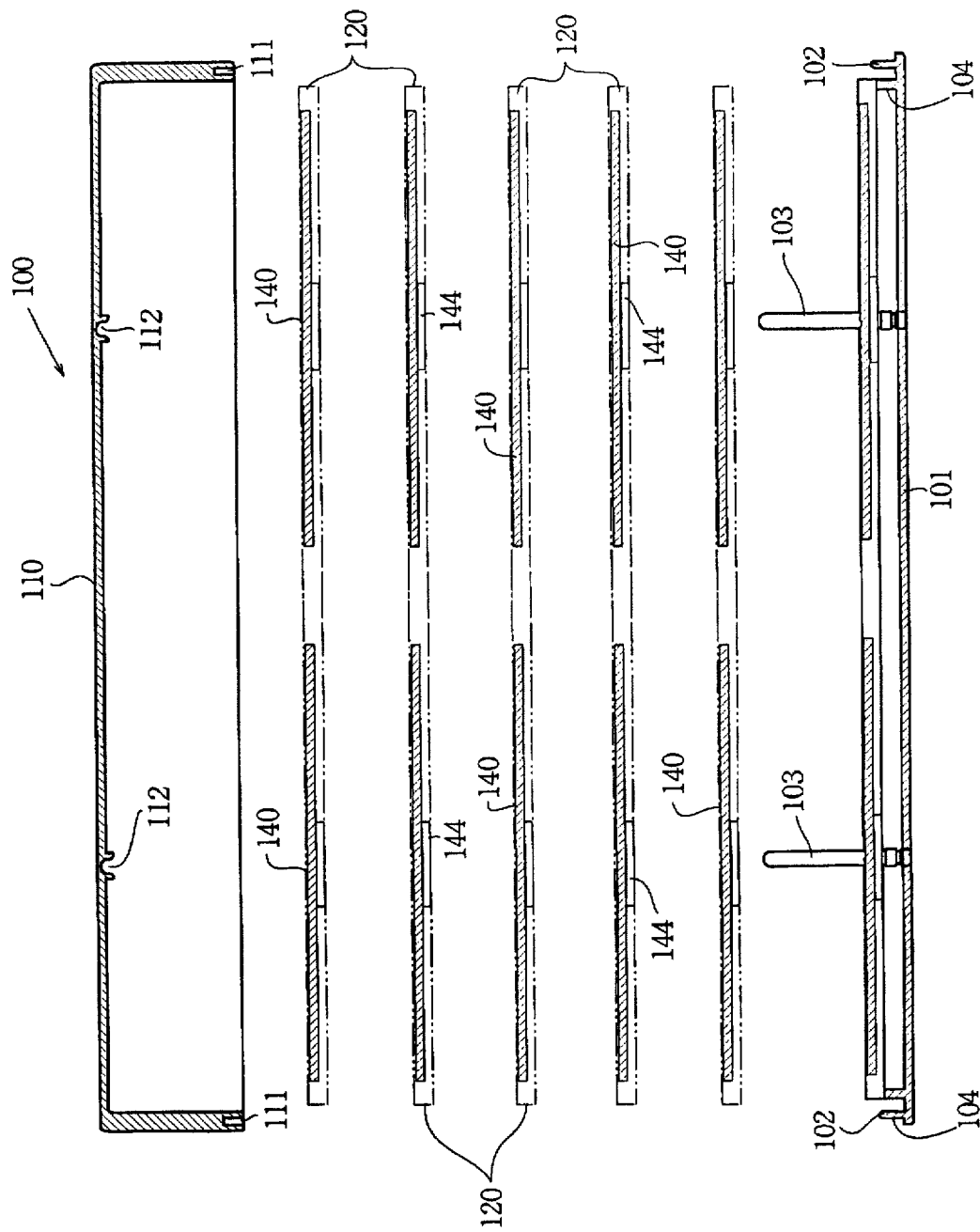
FIG. 6 is a cross section of the magazine pack of FIG. 2 with the frames separated.
Figure 7:
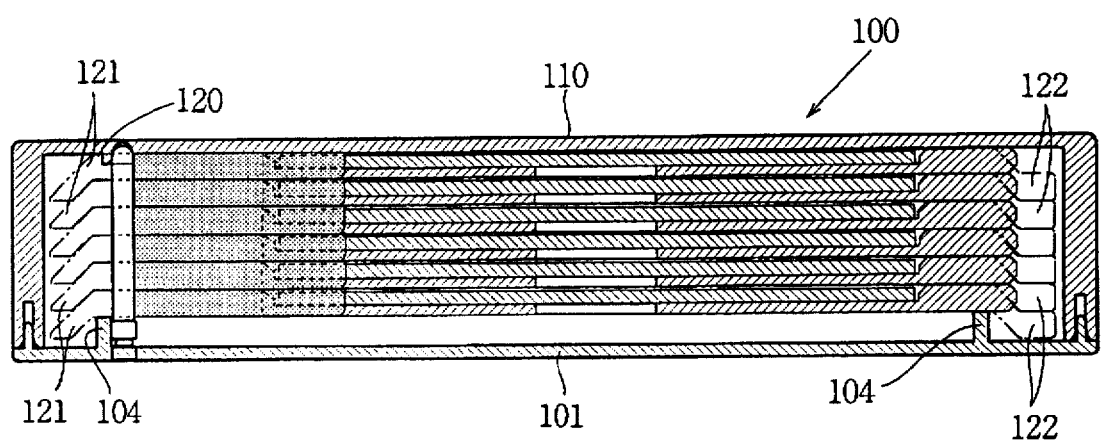
FIG. 7 is a cross section of the magazine pack of FIG. 2.
Figure 8:
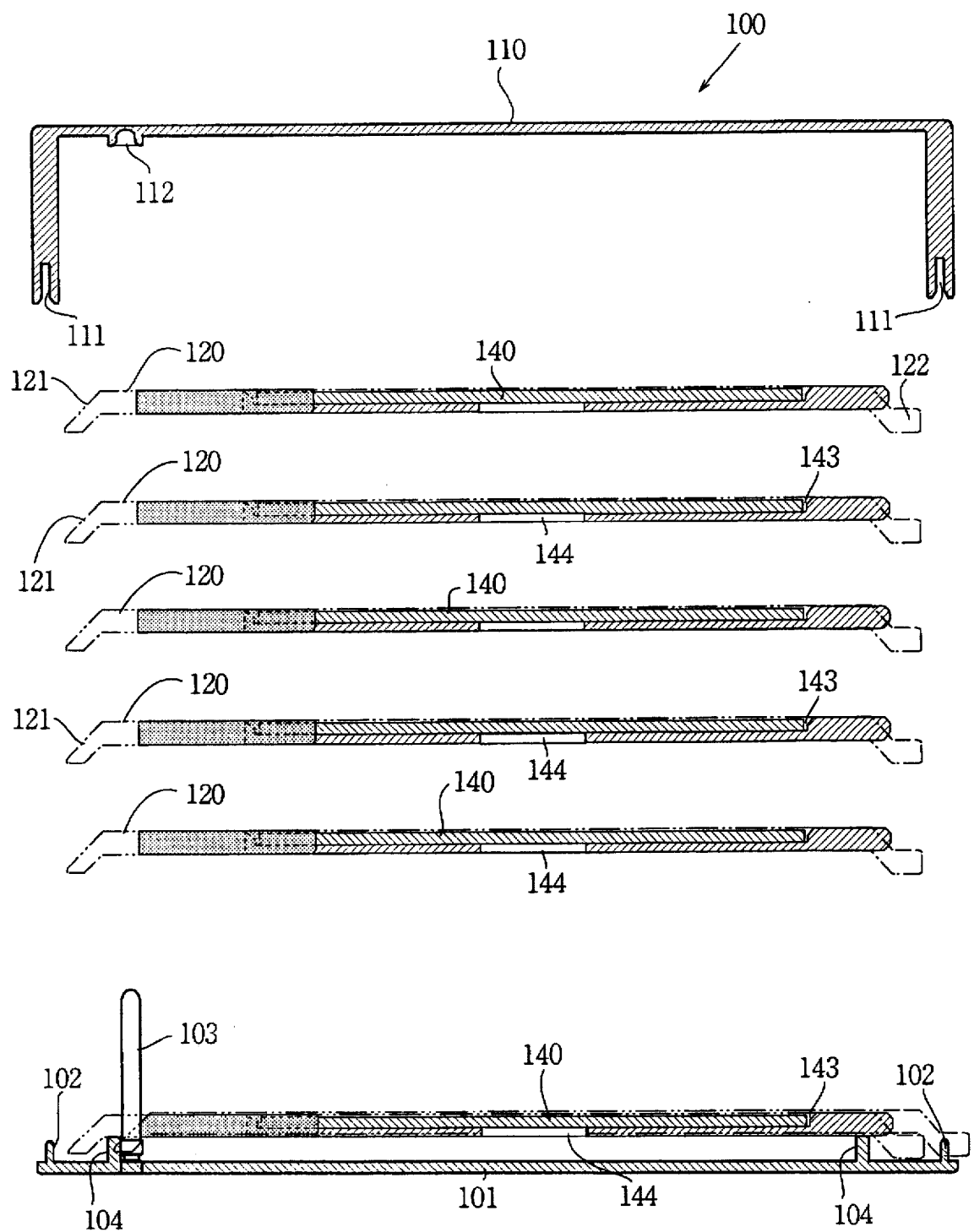
FIG. 8 is a cross section of the magazine pack of FIG. 2 with the frames separated.
Figure 9:
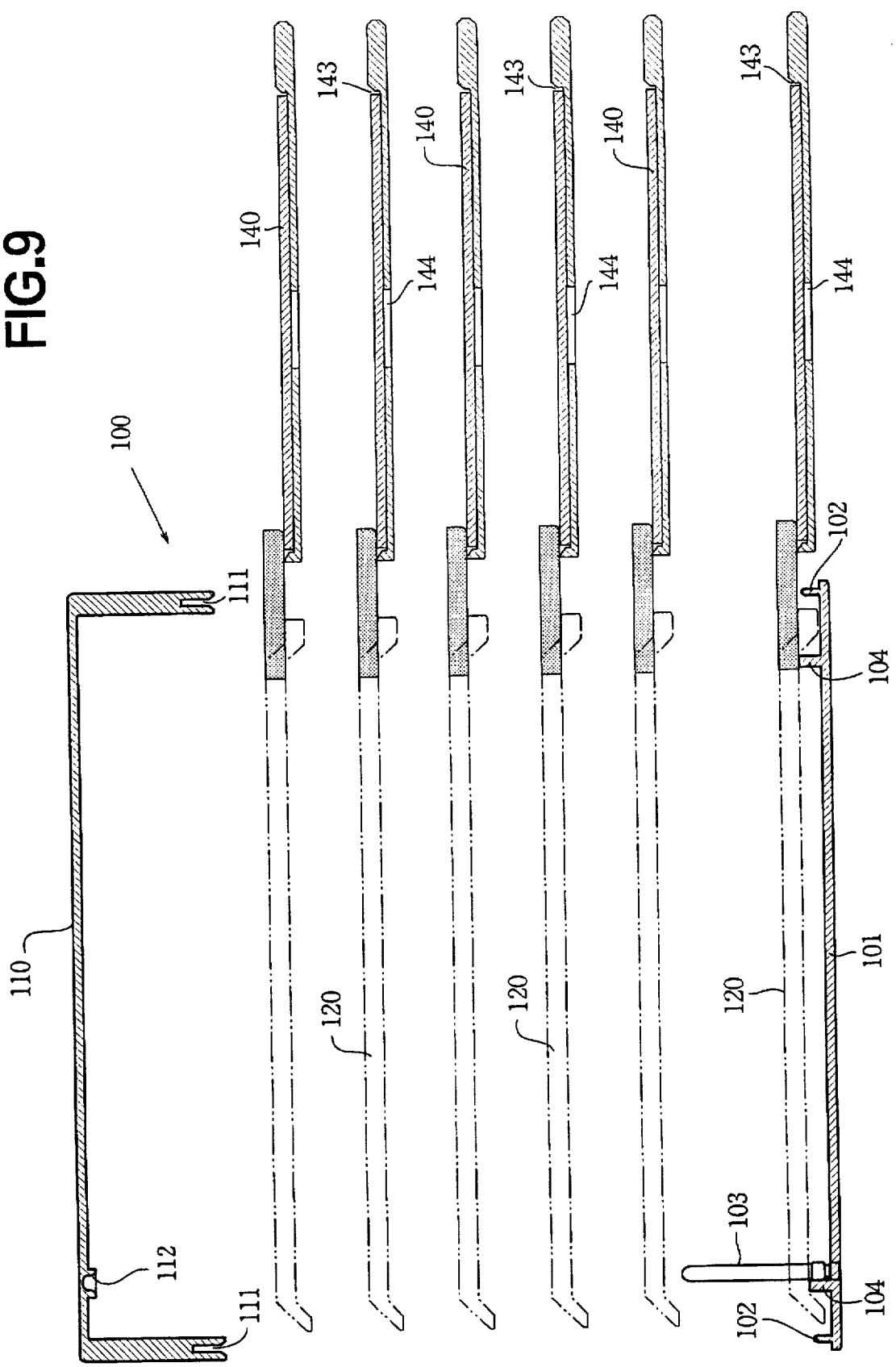
FIG. 9 is a cross section of the magazine pack of FIG. 2 with the frames separated.
Figure 28:
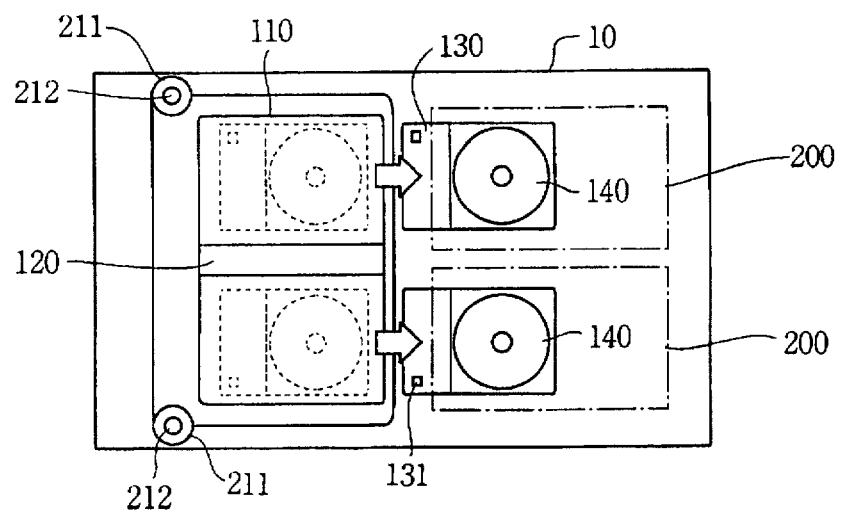
FIG. 28 is a schematic diagram showing how the magazine pack of FIG. 2 is loaded.
Figure 29:
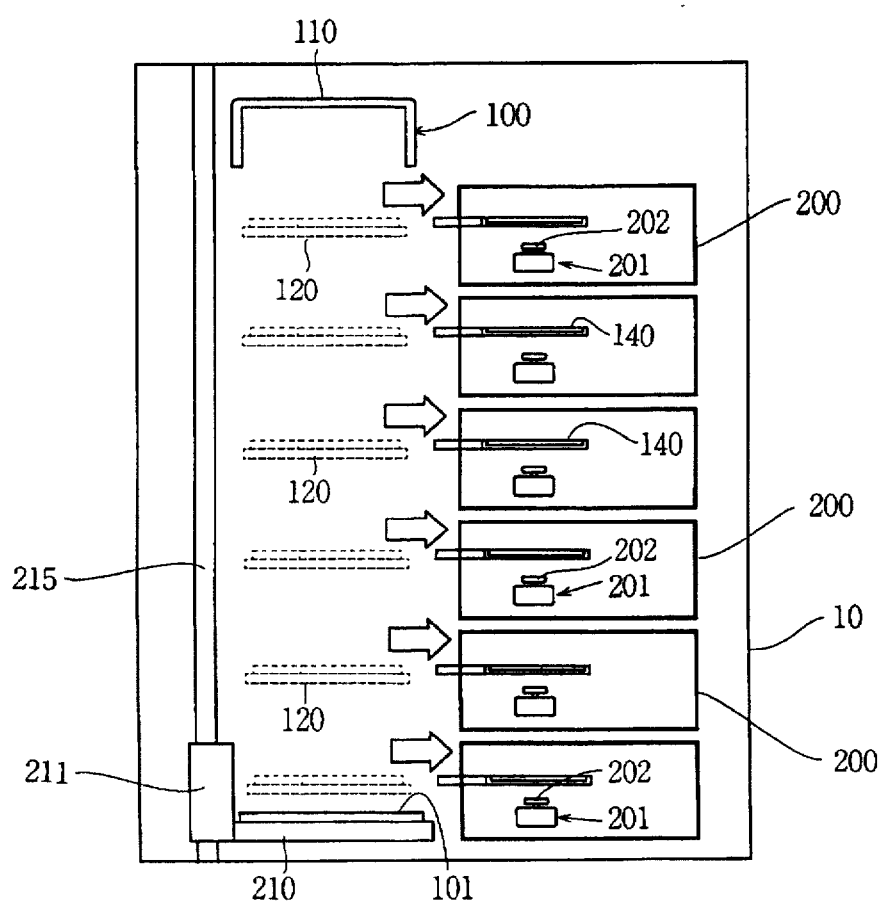
FIG. 29 is a schematic diagram showing how the magazine pack of FIG. 2 is loaded.

As the moving base 15 is moved, the slider 130 of the magazine pack 100 engaged by the hook 402 is drawn out of the frame 120, as shown in FIGS. 4 and 9, and held over the turntable 202 of the disc reproducing unit 201 inside the disc drive unit 200, as shown in FIGS. 28 and 29.

Figure 30:
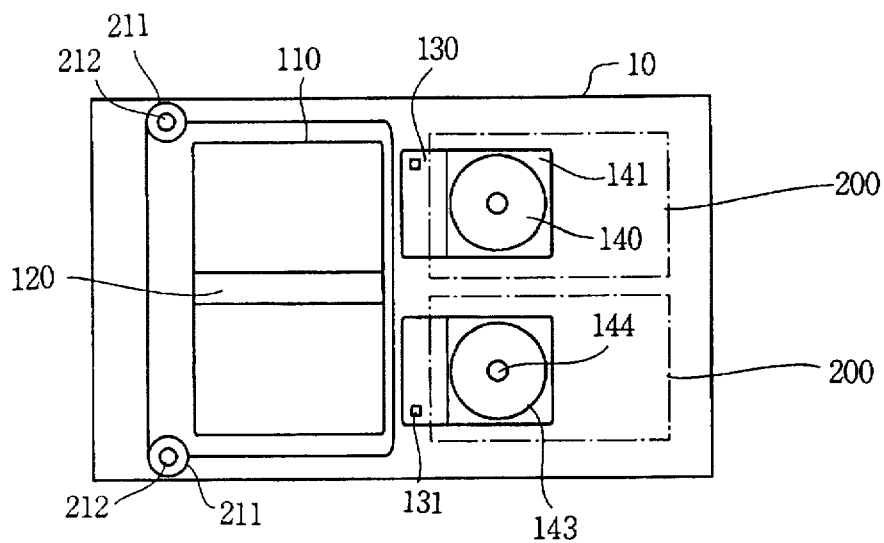
FIG. 30 is a schematic diagram showing how the magazine pack of FIG. 2 is loaded.
Figure 31:
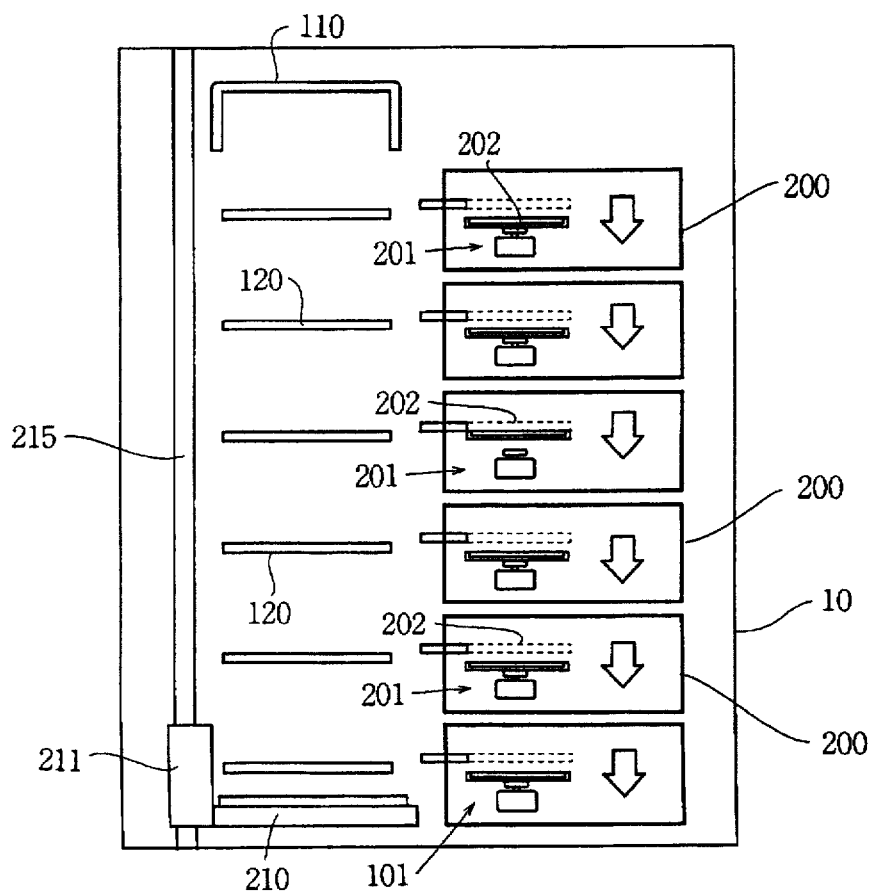
FIG. 31 is a schematic diagram showing how the magazine pack of FIG. 2 is loaded.

Next, as shown in FIGS. 30 and 31, when the tray 141 is lowered onto the turntable 202, the engagement projections 142 of the tray 141 disengage from the engagement projections 132 of the slider 130 (FIG. 4). After the tray 141 is separated from the slider 130, the turntable 202 passes through the turntable insertion opening 144 of the tray 141 and engages the central portion of the disc 140. When the turntable 202 lifts the disc 140 from the disc accommodating groove 143 in the tray 141, a damper located above clamps the central portion of the disc 140 onto the turntable 202.

When the disc 140 is unloaded, the above sequence of operation is reversed.

Figure 26:
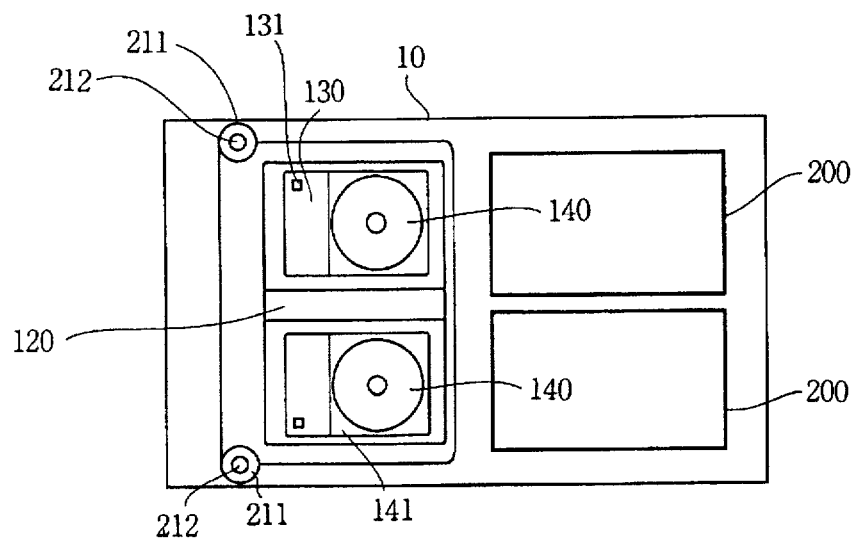
FIG. 26 is a schematic diagram showing how the magazine pack of FIG. 2 is loaded.
Figure 27:
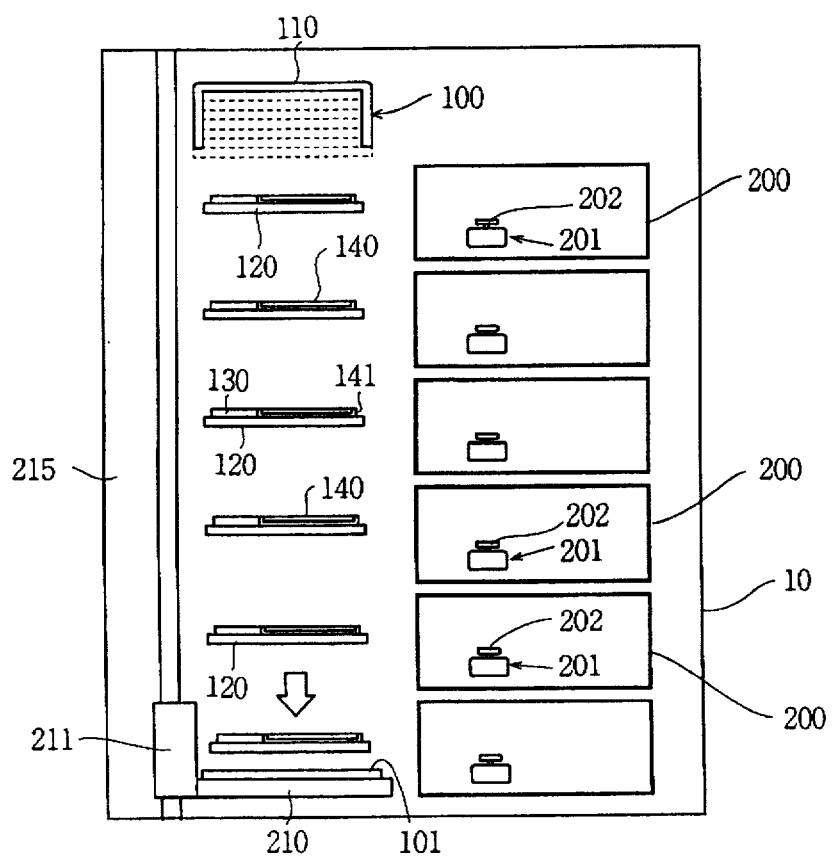
FIG. 27 is a schematic diagram showing how the magazine pack of FIG. 2 is loaded.

That is, when the disc 140 is declamped and released from the turntable 202 and the tray 141 is raised to the same height as the slider 130, the engagement projections 132 of the slider 130 engage with the engagement projections 142 of the tray 141, the slider 410 of the tray transfer mechanism 400 is moved in the direction of arrow d, and the guide pin 411 of the slider 410 engages the edge of the guide slot 12 to move the moving base 15 in the same direction, returning the tray 141 back to the frame 120, as shown in FIGS. 26 and 27.

In this state, as the carriage base 210 is moved upward, the frames 120 separately held by the hook members 320 of the hook mechanism 300 are collected together.

That is, with the lowermost frame 120 separately held by the hook member 320 as shown in FIG. 33a, as the hook member 320 moves up, the frame 120 is pushed up, the frame 12 is pushed up, resting on the bottom plate 101 of the magazine pack 100 on the carriage base 210. The lower end of the inclined projection 121 of the frame 120 slides up the inclined portion 326 of the hook member 320, as shown in FIG. 33b. When the lower end of the inclined projection 121 rides over the vertex portion 327 of the inclined portion 325 of the hook member 320 as shown in FIG. 33c, it is released from the hook portion 324 of the hook member 320 as shown in FIG. 33d. At this time, the hook member 320 is returned to the predetermined position by the force of the spring 322.

Figure 43:
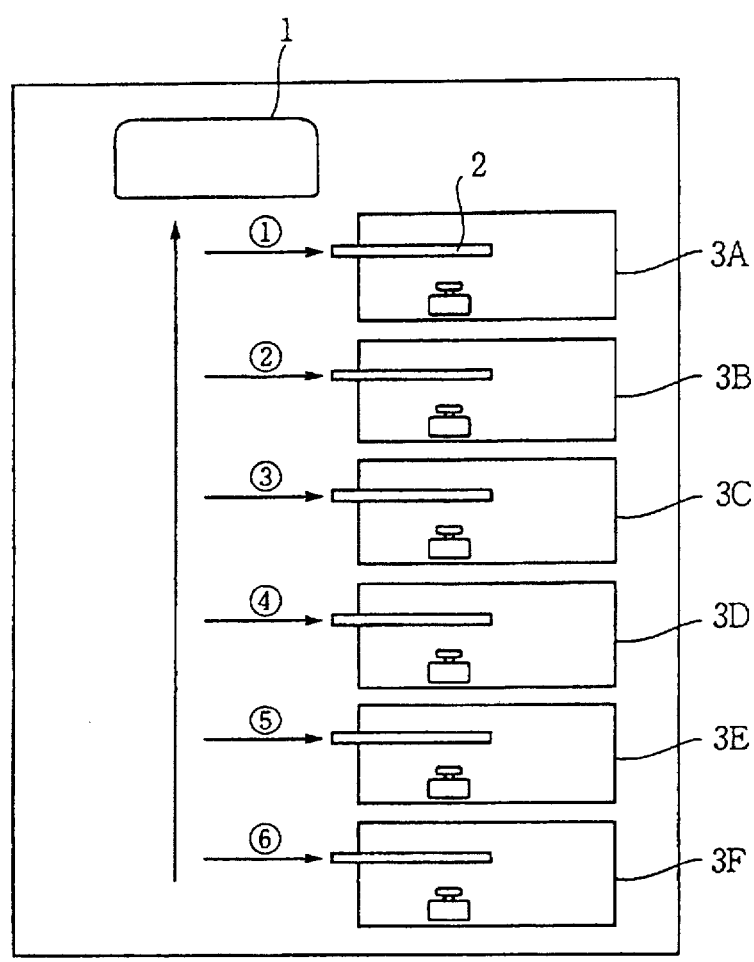
FIG. 43 is a schematic diagram showing a conventional disc apparatus to record and reproduce a plurality of discs with a plurality of disc drive units.
Figure 44:
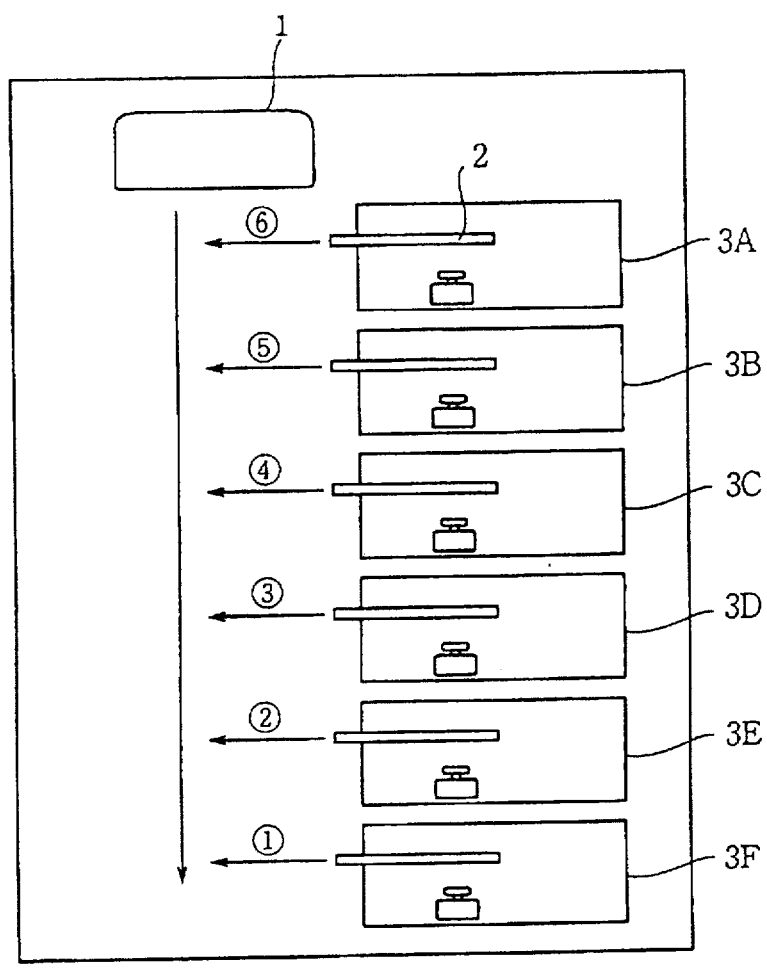
FIG. 44 is a schematic diagram showing another disc apparatus of FIG. 43 with a different disc loading method.

In this way, the upward movement of the carriage base 210 disengages the frames 120 from the hook members 320 successively, stacking them together and putting them in the cover 110 held in the upper part of the apparatus body 10, as shown in FIG. 43.

After the magazine pack 100 is assembled, the magazine loading mechanism 160 shown in FIGS. 18 to 23 is operated in the reverse sequence to discharge the magazine pack 100 from the magazine pack insertion opening 20 of the apparatus body 10.

That is, because the rotating body 163 is rotated in the reverse direction, the roller 165 at the front end of each arm 166 moves through the loading groove 151 in the opposite direction, pushing the magazine pack 100 out of the carriage base 210. At this time, as shown in FIGS. 13 and 14, the engagement piece 171 at the front end of each arm 166 engages and slides along the underside of the cam portion 173 of the guide member 172 on the carriage base 210 and is forced to move down against the force of the spring 168 until the roller 165 of the arm 166 no longer hinders the retrieval of the magazine pack 100.

As described above, this embodiment offers the following advantage. That is, when the magazine pack 100, whose trays can be separated by unlocking the lock mechanism, is loaded into the magazine pack insertion opening 20 of the apparatus body 10, the magazine loading mechanism 160 of the carriage base 210 unlocks the lock mechanism 150 of the magazine pack 100. As the carriage base 210 moves down, the frames 120 are held by the hook members 320 of the hook mechanism 300 corresponding to the disc drive units 200. The tray transfer mechanism 400 transfers the trays 141, which are held in the frames 120 and contain the discs 140, into the disc drive units 200 simultaneously. This configuration enables reduction in the disc loading time.

Although this embodiment concerns a case where the trays 141 in the frames 120 containing the discs 140 are drawn into the disc drive units 200 simultaneously, it is possible to draw the tray 141 into the corresponding disc drive unit 200 each time one of the frames 120 in the magazine pack 100 is separated.

In other words, as shown in FIGS. 34 to 37, at the same time that the frames 120 are separated and held by the hook members 320 of the hook mechanism 300 as the carriage base 210 moves down, the trays 141 in the frames 120 may be successively drawn into the corresponding disc drive units 200 by the tray transfer mechanism 400.

One embodiment of this invention has been described by referring to FIG. 1 through FIG. 37. In another embodiment, it is possible to provide a frame lock mechanism to lock each frame 120 to the bottom plate 101. This frame lock mechanism is to prevent positional deviations among the frames 120 and is especially effective when the frames 120 are light in weight. This mechanism is explained by referring to FIGS. 38 to 42. The point in which this second embodiment differs from the first embodiment of FIGS. 1 to 37 is that the frame 120 is so sized as to hold only one tray 141 and the magazine pack is sized accordingly.

Figure 41:
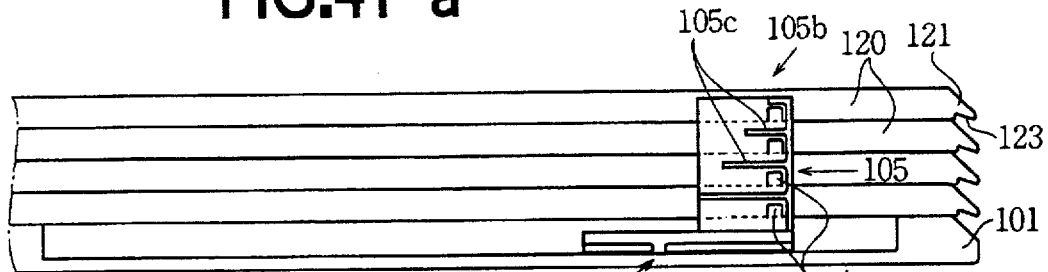
FIGS. 41a through 41e are schematic diagrams showing the operation of the lock mechanism of FIG. 38.
Figure 41:
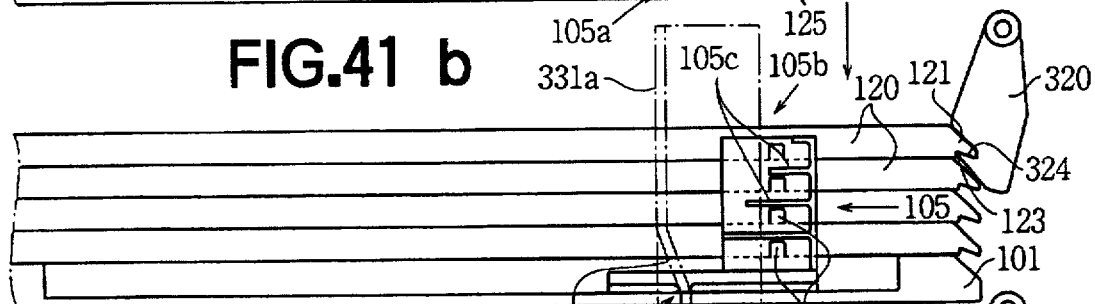
Figure 41:
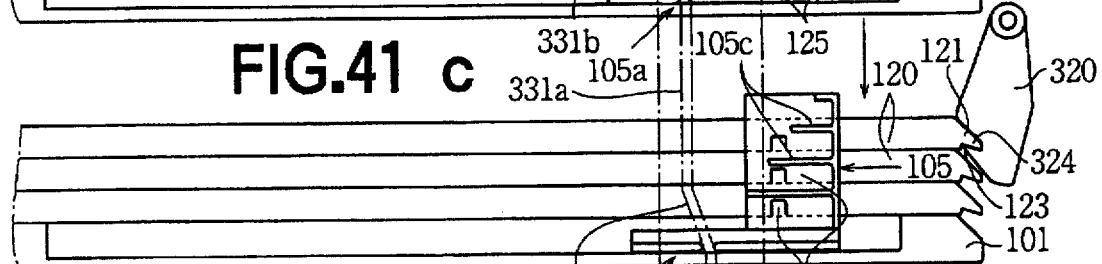
Figure 41:
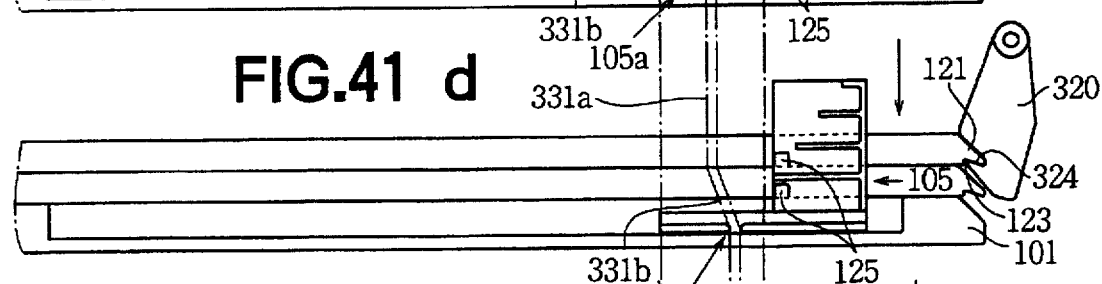
Figure 41:
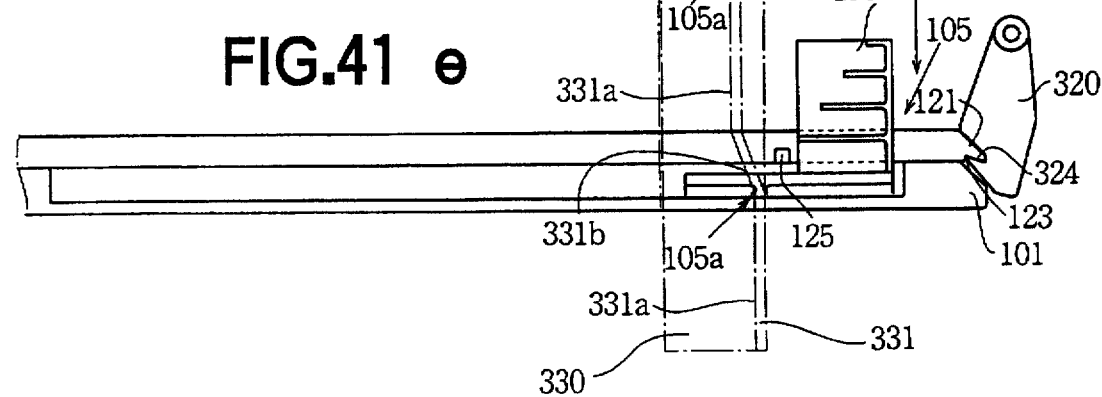
Figure 42:
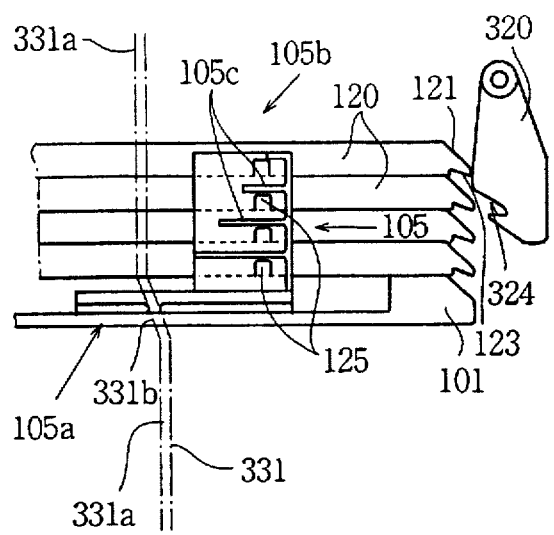
FIGS. 42a through 42d are schematic diagrams showing the operation of the lock mechanism of FIG. 38.
Figure 42:
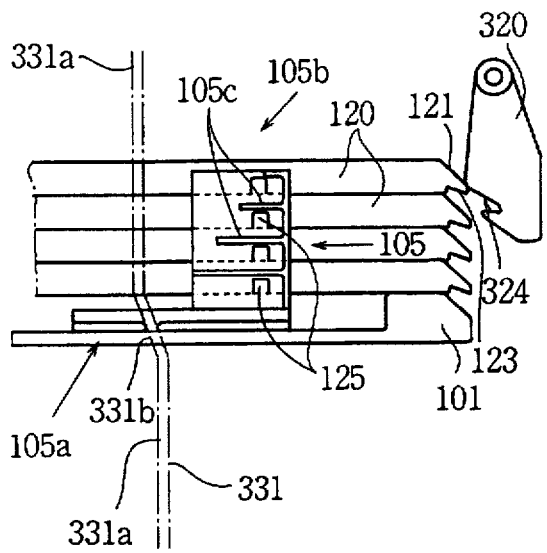
Figure 42:
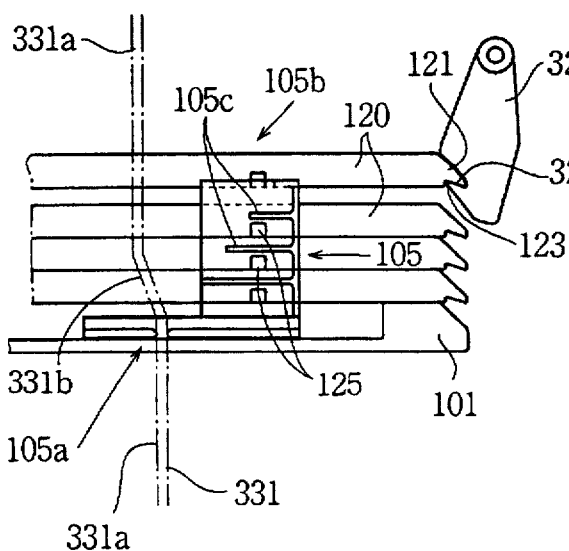
Figure 42:
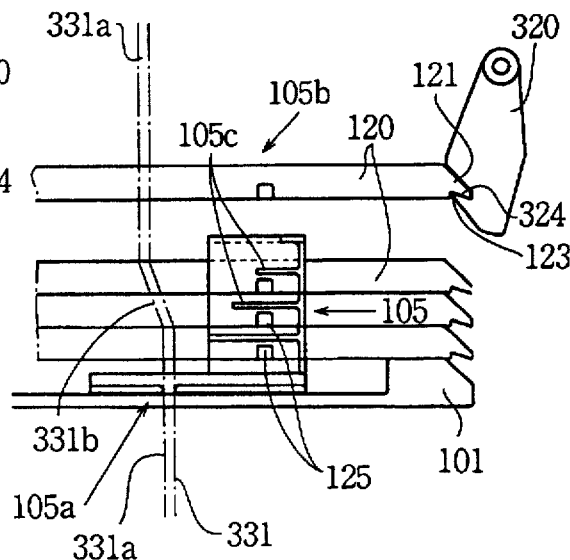

The bottom plate 101 has three lock sliders 105 movable in the direction of arrow. The lock slider 105 is provided with an engagement recess 105a that engages a guide cam 331 described later and with a lock portion 105b that fixes each frame 120 to the bottom plate 101. The lock portion 105b consists of partition plates 105c of different lengths (FIG. 41). The frame 120 has three slots 124, which correspond to the lock sliders 105 and which accommodate the lock portions 105b of the lock sliders 105 when the frame 120 is mounted on the bottom plate 101. Inside the slots 124 are provided projections 125 that are locked by the partition plates 105c of the lock portion 105b.

In the apparatus body 10 there are provided three guide plates 330 that extend in the direction of arrangement of the frames 120 and which have a stair-like guide cam 331 consisting of a plurality of linear portions 331a and stepped portions 331b. The stepped portions 331b are located at positions corresponding to the vertically arranged hook members 320. These stepped portions 331b unlock the frames 120 successively, as described later.

Figure 38:
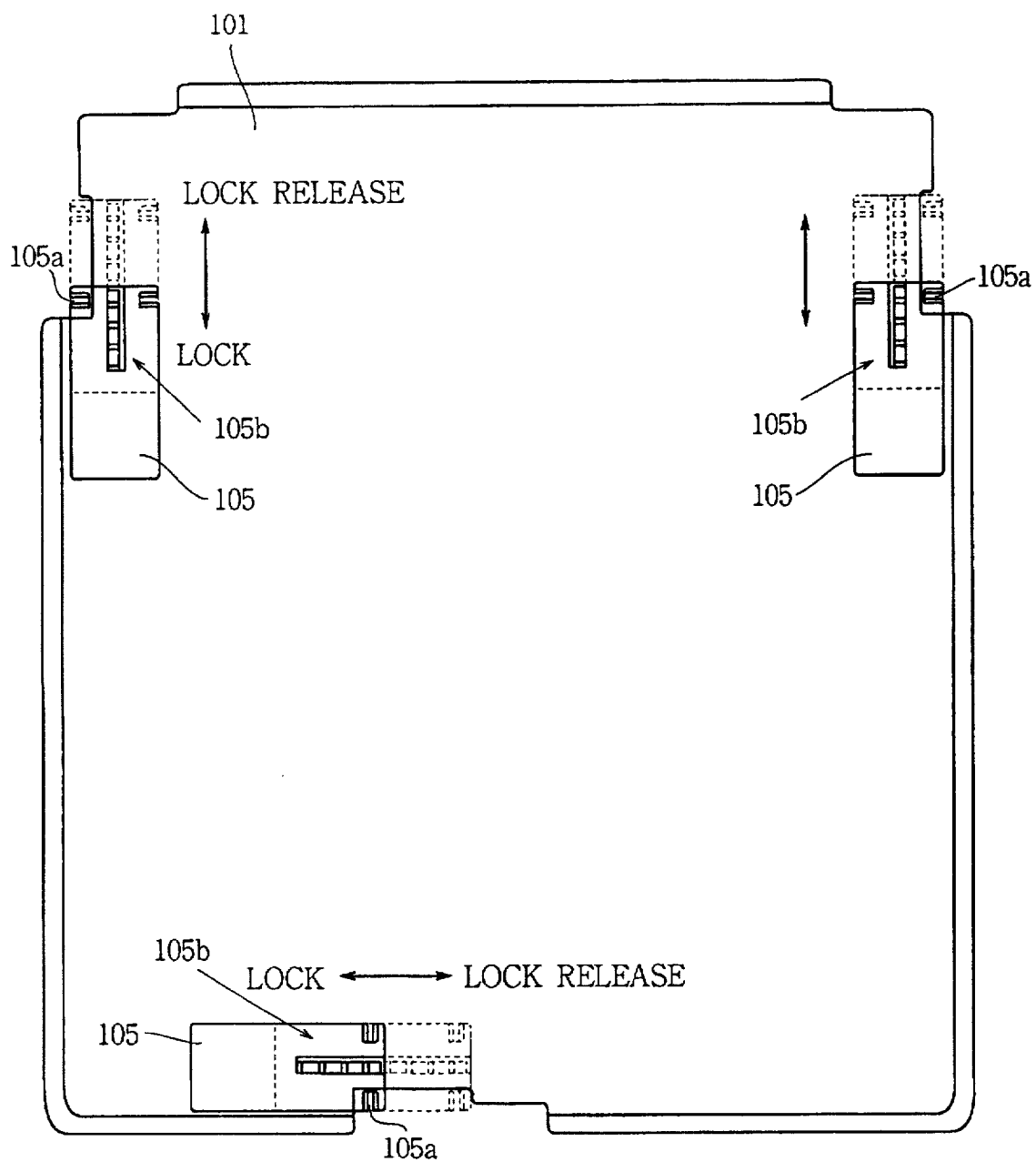
FIG. 38 is a schematic diagram showing another embodiment with the configuration of magazine pack of FIG. 2 changed.
Figure 39:
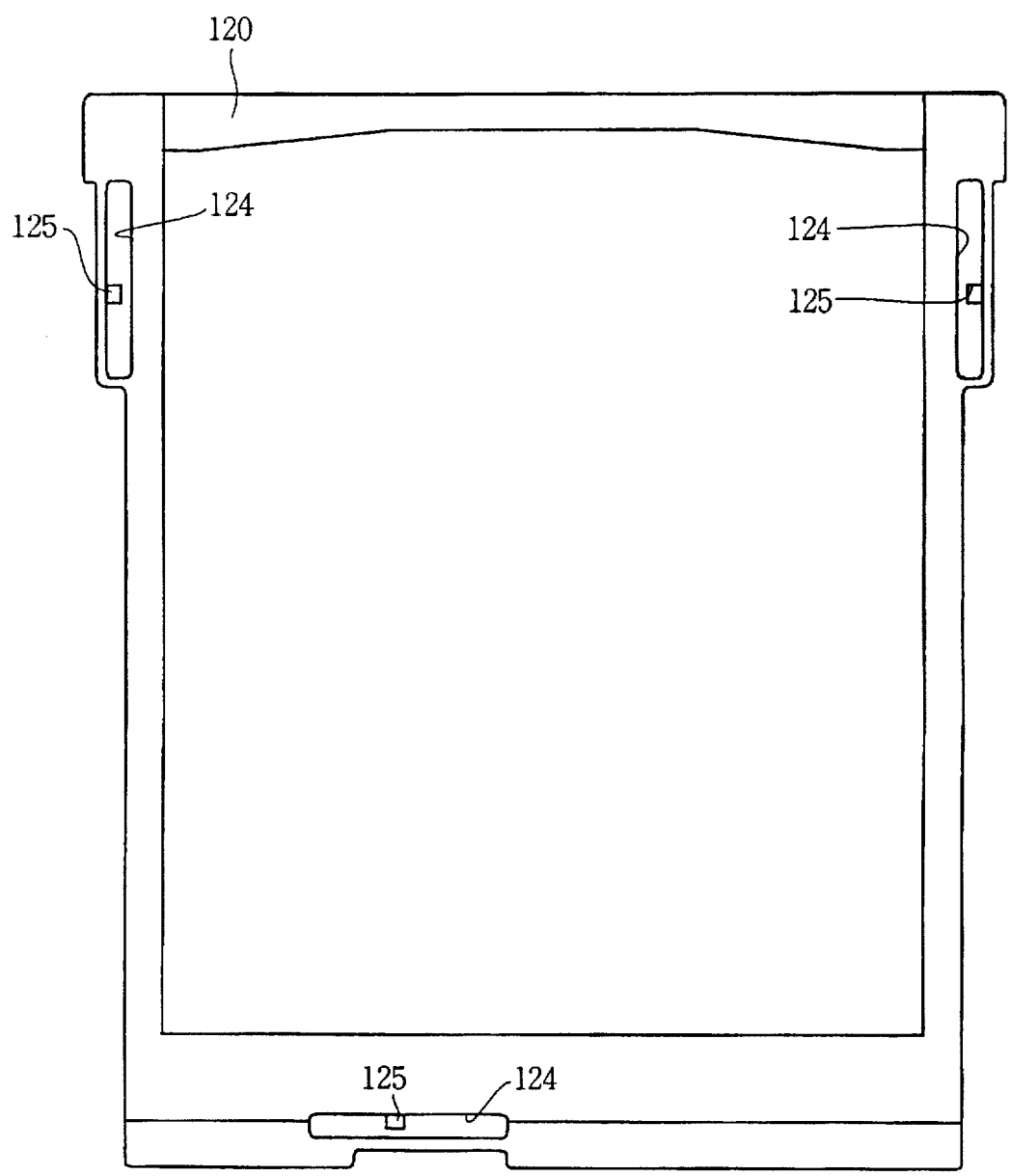
FIG. 39 is a schematic diagram showing still another embodiment with the configuration of magazine pack of FIG. 2 changed.
Figure 40:
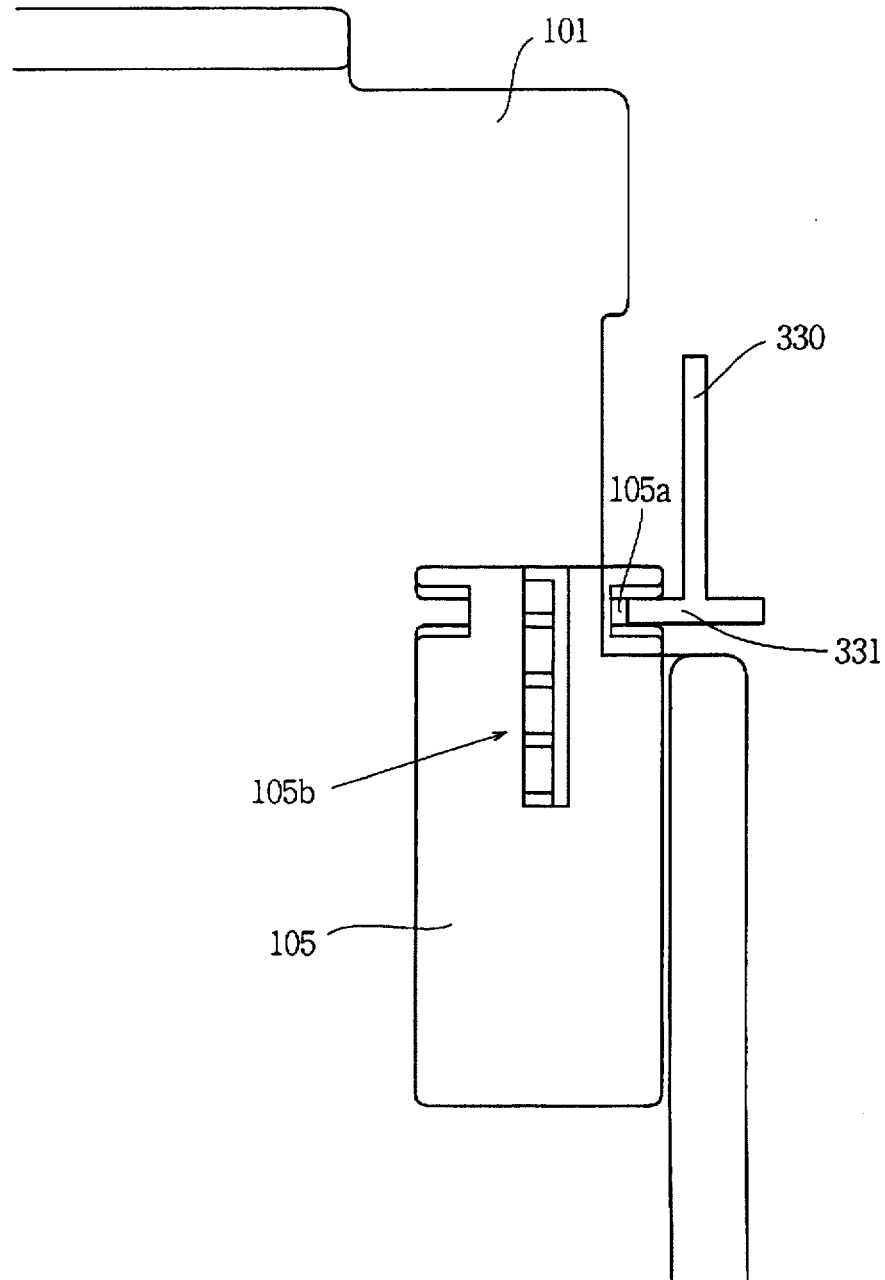
FIG. 40 is a schematic diagram showing the operation of the lock mechanism of FIG. 38.

A plurality of stacked frames 120 are placed on the bottom plate 101 by moving the lock sliders 105 to the unlock side, as shown in FIGS. 38 and 41e, and putting the frames 120 successively on the bottom plate 101 with the lock portions 105b inserted into the slots 124 of the frame 120.

After all the frames 120 are mounted on the bottom plate 101, when the lock sliders 105 are moved to the lock side as shown in FIG. 41a, the partition plates 105c move to positions above the projections 125 of the frames 120 to hold the projections 125, thereby locking the frames 120 to the bottom plate 101. At this time, the projections 125 of the frames 120 are in light contact with the partition plates 105c, blocking the movement of the lock sliders 105 themselves.

Next, the operation of unlocking and separating the frames is explained by referring to FIGS. 41a to 42d.

First, the magazine pack 100 in a frame locked condition (the state of FIG. 41a in which the lock slider 105 is at the end of the movable range) is drawn to a position in the apparatus body 10 shown in FIG. 41a by the magazine loading mechanism 160. Next, immediately after the magazine pack 100 is lowered vertically, the guide cam 331 of the guide plate 330 is inserted into the engagement recess 105a of the lock slider 105. In this state, the magazine pack 100 is moved down with the engagement recess 105a sliding along the guide cam 331. Then, as shown in FIG. 42a, the engagement recess 105a reaches the uppermost stepped portion 331b of the guide cam 331. As the engagement recess 105a slides along the stepped portion 331b, the lock slider 105 is pushed out toward the unlock side by the amount of step of the stepped portion 331b, as shown in FIGS. 41b and 42b.

At this time, the moment shortest, top-tier partition plate 105c of the lock portion 105b parts from the projection 125 of the uppermost stacked frame 120, the hook portion 324 of the hook member 320 fits into the engagement groove 123 of the inclined projection 121 of the top frame 120, with the result that the top frame 120 is separated, locked and supported by the hook member 320, as shown in FIGS. 42c and 42d.

Because the second highest and subsequent partition plates 105c and the projections 125 of the second and subsequent frames 120 are engaged, there are no plays in the second and lower frames 120.

As the magazine pack 100 continues moving down, the lock slider 105 is successively pushed toward the unlock side by the stepped portions 331b of the guide cam 331, as shown in FIGS. 41c to 41e, so that the second and lower frames 120 are successively separated and locked by the corresponding hook members 320 in a way mentioned above.

At this time, because the frames 120 are unlocked one by one and separated and supported successively by the hook members 320, the displacement of the frames 120 can be avoided, assuring reliable separation and locking operation on the part of the hook members 320.

As the bottom plate 101 is raised when the magazine pack 100 is unloaded, the lowermost frame 120 is pushed up, resting on the bottom plate 101. This unlocks the bottom frame 120 from the hook member 320 and at the same time the lock slider 105 is returned to the lock side by the lowermost stepped portion 331b of the guide cam 331, locking the lowermost frame 120 to the bottom plate 101.

In this way, the frames 120 are stacked on the bottom plate 101 and in the final step of operation the lock slider 105 is returned to the lock-side end of the movable range, locking all the frames 120 to the bottom plate 101. In this condition, the magazine pack 100 is pushed out of the apparatus body 10 by the magazine loading mechanism 160.

As described above, with the information recording and reproducing apparatus of this invention, as the magazine pack is moved down in a disc player arrangement direction by the magazine pack loading means, the frames are positioned at predetermined locations corresponding to the individual disc players and then the trays held on the frames are loaded into the corresponding disc players simultaneously by the tray loading means. This loading system reduces the disc loading time significantly compared with the conventional system.

It is also possible to successively load the trays held on the frames positioned at predetermined locations into the disc players one at a time. In this case, too, the disc loading time can be reduced compared with the conventional system.

Further, the magazine pack has a lock mechanism to lock the frame-accommodating bottom plate and cover. The lock mechanism is unlocked by the unlocking means before the magazine pack is moved down for tray distribution. This improves safety of the discs and protects them against dust.

The loading of the magazine pack into the apparatus body is done by driving the rollers of the moving members fitted in the loading groove formed in the magazine pack. This assures smooth loading of the disc-containing pack without giving excess load to the pack.

When the abut portion of the frame separation and holding means contacts the periphery of the frame, the engagement portion is separated from the frame periphery. This construction simplifies the mechanism for frame separation and positioning.

Further, the trays located at predetermined positions are loaded simultaneously into the corresponding disc players by driving the moving members of the tray loading means, which are movable in a direction from the predetermined positions toward the disc players. This construction simplifies the mechanism of the tray loading means and reduces the time taken to load a plurality of discs.

While the presently preferred embodiments of the present invention has been shown and described, it is to be understood that these disclosures are for the purpose of illustration and that various changes and modifications may be made without departing from the scope of the invention as set forth in the appended claims.

What is claimed is:

1. An information recording and reproducing apparatus comprising:

an apparatus body;

a plurality of disc players arranged in a predetermined direction inside the apparatus body;

a magazine pack containing a plurality of frames, each holding a tray holding a disc and separable from each other;

a magazine pack loading means for moving the magazine pack taken into the apparatus body in the predetermined direction of disc player arrangement;

a frame separation and holding means which, when moving the magazine pack by the magazine pack loading means, separates the frames one at a time and positions them at predetermined locations corresponding to the disc players; and a tray transfer means for transferring the trays between the predetermined locations and the disc players.

2. The information recording and reproducing apparatus according to claim 1, wherein each of the frames has a plurality of frame members for slidably holding the trays and a bottom plate for stacking the frame members thereon, and the frame separating and holding means successively separates and holds the stacked frames beginning with the uppermost frame as the magazine pack is moved down.

3. The information recording and reproducing apparatus according to claim 1, wherein the magazine pack includes a bottom plate for mounting the frames thereon, a cover removably mounted to the bottom plate;

the cover cooperating with the bottom plate to accommodate the frames, and a lock mechanism for locking the bottom plate and the cover.

4. The information recording and reproducing apparatus according to claim 1, wherein the magazine pack has a loading groove, the magazine pack loading means is installed inside the apparatus body and provided with a moving member having a roller fitted in the loading groove, and as the roller is displaced along the loading groove, the magazine pack is taken into the apparatus body.

5. The information recording and reproducing apparatus according to claim 2, wherein the frame includes a lock portion near the periphery thereof, wherein the frame separation and holding means comprises a hook member being rotatable with respect to the apparatus body and having an abut portion to be in contact with the periphery of the frame and an engagement portion to be engaged with the lock portion, and an urging member urging the hook member in a direction in which the engagement portion engages the lock portion of the frame, and wherein when the abut portion contacts the periphery of the frame, the engagement portion is disengaged from the periphery of the frame.

* * * * *

UNITED STATES PATENT AND TRADEMARK OFFICE
CERTIFICATE OF CORRECTION

PATENT NO. : 5,793,717

DATED : August 11, 1998

INVENTOR(S) : Morita et al.

It is certified that error appears in the above-identified patent and that said Letters Patent is hereby corrected as shown below:

ON THE TITLE PAGE:

Item [30], Foreign Application Priority Data;

delete "7-100048" insert therefor -- 7-10048 --

Signed and Sealed this

Twenty-fourth Day of November, 1998

Attest:

BRUCE LEHMAN

Attesting Officer

Commissioner of Patents and Trademarks